United States Patent [19]

Shishizuka

[11] Patent Number: 5,786,906
[45] Date of Patent: Jul. 28, 1998

[54] METHOD AND APPARATUS FOR PROCESSING IMAGE

[75] Inventor: Junichi Shishizuka, Tokyo, Japan

[73] Assignee: Canon Kabushiki Kaisha, Tokyo, Japan

[21] Appl. No.: 292,049

[22] Filed: Aug. 18, 1994

Related U.S. Application Data

[63] Continuation of Ser. No. 672,098, Mar. 19, 1991, abandoned.

[30] Foreign Application Priority Data

| Mar. 19, 1990 | [JP] | Japan | 2-70935 |
| Mar. 19, 1990 | [JP] | Japan | 2-70936 |
| Mar. 19, 1990 | [JP] | Japan | 2-70937 |
| Mar. 19, 1990 | [JP] | Japan | 2-70938 |
| Aug. 3, 1990 | [JP] | Japan | 2-206549 |
| Aug. 3, 1990 | [JP] | Japan | 2-206550 |
| Aug. 3, 1990 | [JP] | Japan | 2-206608 |
| Aug. 3, 1990 | [JP] | Japan | 2-206609 |
| Aug. 3, 1990 | [JP] | Japan | 2-206610 |

[51] Int. Cl.⁶ .................................................. H04N 1/46
[52] U.S. Cl. .................. 358/500; 358/515; 358/522; 382/168
[58] Field of Search .................. 358/500, 501, 358/515, 520, 521, 522, 401, 443, 448, 451; 382/30, 17, 162, 168

[56] References Cited

U.S. PATENT DOCUMENTS

| 4,476,486 | 10/1984 | Ayata et al. | 358/78 |
| 4,739,397 | 4/1988 | Hayashi | 358/80 |
| 4,831,434 | 5/1989 | Fuchsberger | 358/521 |
| 4,879,595 | 11/1989 | Niki et al. | 358/75 |
| 4,930,021 | 5/1990 | Okada | 358/451 |
| 4,953,012 | 8/1990 | Abe | 358/75 |
| 4,975,768 | 12/1990 | Takaraga | 358/538 |
| 5,109,274 | 4/1992 | Washio et al. | 382/17 |
| 5,128,748 | 7/1992 | Murakami et al. | 358/75 |
| 5,136,401 | 8/1992 | Yamamoto et al. | 358/474 |

FOREIGN PATENT DOCUMENTS

| 313794 | 5/1989 | European Pat. Off. |
| 363146 | 4/1990 | European Pat. Off. |
| 1241978 | 9/1989 | Japan | 358/75 |

Primary Examiner—Thomas D. Lee
Attorney, Agent, or Firm—Fitzpatrick, Cella, Harper & Scinto

[57] ABSTRACT

This invention relates to a method and apparatus for processing an image and particularly a method and apparatus for providing a function of automatically judging whether an input image is a color or monochrome image. This invention discloses various arrangements for preventing errors in the above judgement.

24 Claims, 37 Drawing Sheets

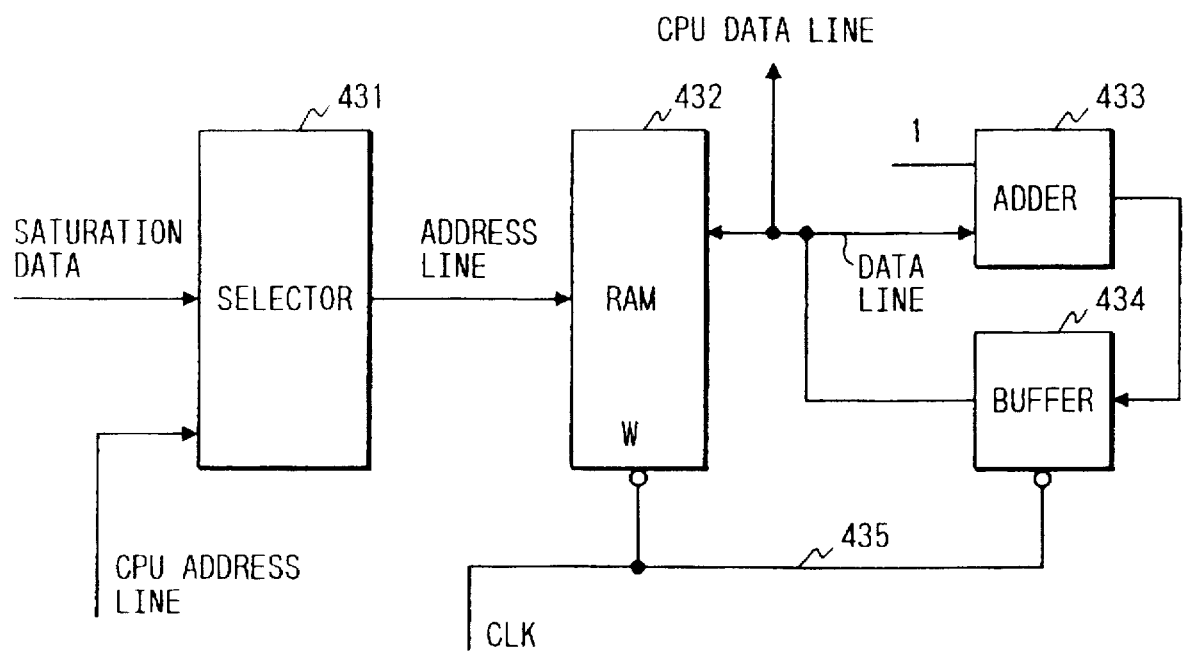

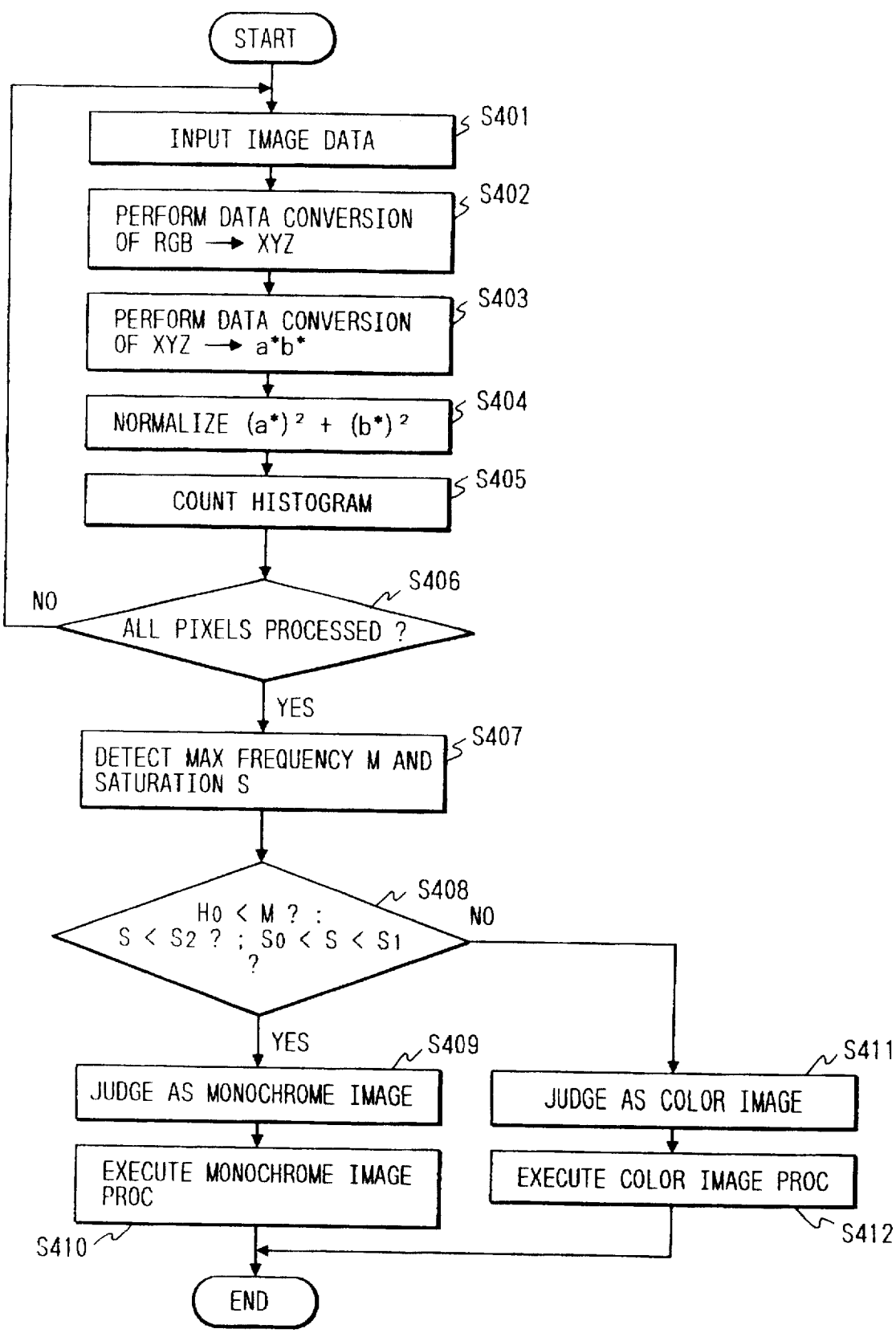

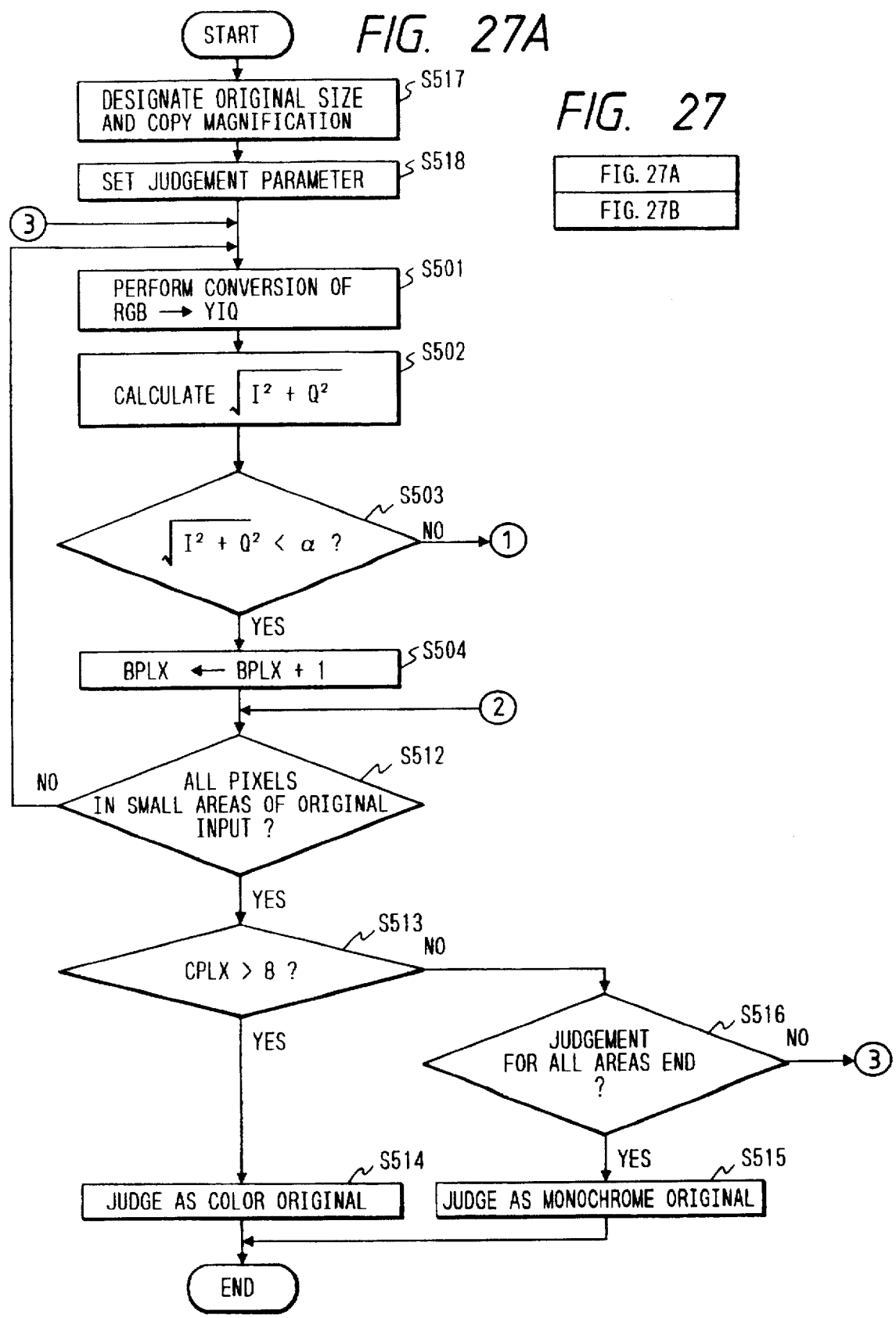

FIG. 28A
FIG. 28B
CHARACTER PORTION
COLOR MISREGISTRATION PORTION
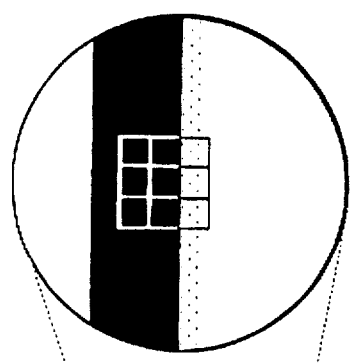
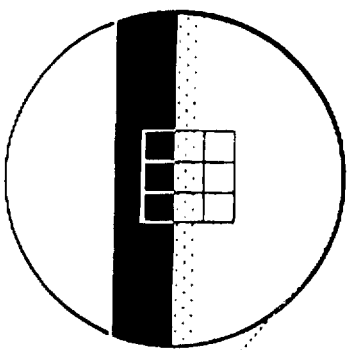
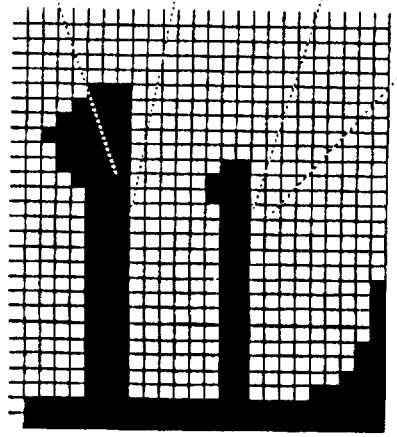
| $S_1$ | $S_4$ | $S_6$ |
| --- | --- | --- |
| $S_2$ | C | $S_7$ |
| $S_3$ | $S_5$ | $S_8$ |

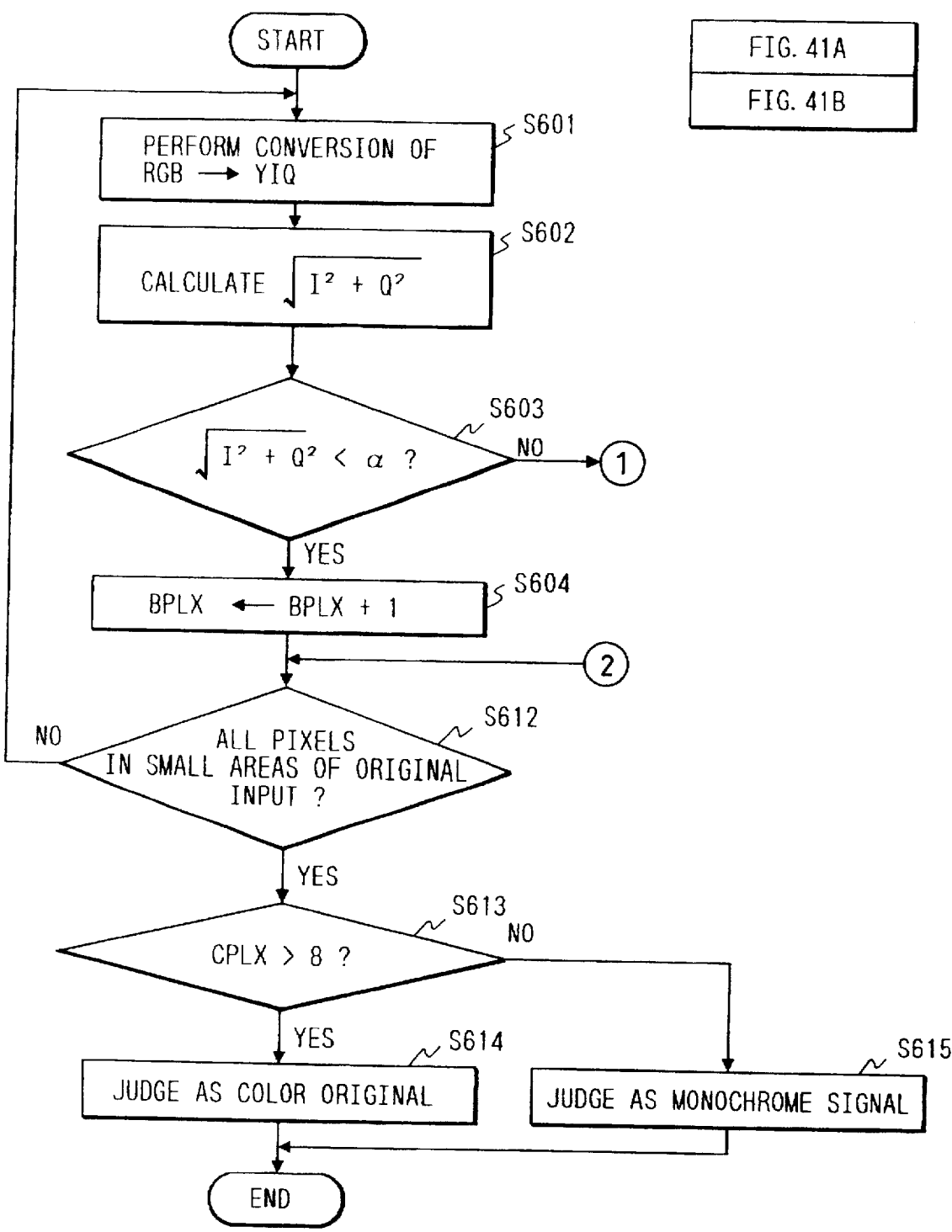

1

METHOD AND APPARATUS FOR PROCESSING IMAGE

This application is a continuation of application Ser. No. 07/672,098 filed Mar. 19, 1991, now abandoned.

BACKGROUND OF THE INVENTION

1. Field of the Invention

The present invention relates to a system such as a color copying machine, a color scanner, or a color facsimile machine for processing a color image and, more particularly to color/monochrome judgement of an input image.

2. Related Background Art

A conventional color image processing system performs neither automatic judgement of a color image and a monochrome original nor processing based on such judgement result.

① For example, in color original copying, when a monochrome original is copied by overlapping color recording agents, a black character, line, or dot cannot be obtained due to color misregistration and spectral and distribution characteristics of inks, resulting in poor appearance.

② In color original communication by, e.g., a color facsimile machine, in addition to poor print quality in item ① described above, when three color-separated component data (e.g., R, G, and B; or C, M, and Y) are transmitted, the transmission time is prolonged and the communication cost is increased even if the transmitted image is a monochrome image.

Techniques for performing color/monochrome original judgement are disclosed in U.S. Pat. No. 4,953,012 and U.S. patent application Ser. Nos. 416,587 and 556,370.

Systems proposed by these prior-art inventions perform chromatic/achromatic judgement using a ratio of three components of three primary colors (RGB or XYZ) of an input image signal. For example, if input levels of the three primary colors have almost the same values, an achromatic color is judged. However, when variations in values of the three components are present, a chromatic color is judged. Judgement of each pixel is repeated for all pixels of an original subjected to chromatic/achromatic judgement. When the number of pixels representing chromatic colors exceeds a given threshold value, the original is judged as a color original. Otherwise, the original is judged as a monochrome original.

In the above prior art, when reading precision of an image input color sensor is poor, pixels around a black character of an input image are often judged as chromatic pixels. For this reason, a monochrome original is erroneously judged as a color original. In addition, when the original has a light undercolor, a judgement error also occurs. When an original is read in an enlargement mode, a degree of color misregistration is increased, and a monochrome original is more frequently misjudged as a color original. When a monochrome original with a red underline is taken into consideration, a ratio of the number of pixels of a red line to that of all pixels of the original is very low, and this monochrome original is misjudged as a color original or is properly judged as a monochrome image, depending on the length of the underline.

Color/monochrome original judgement is performed by counting the number of color pixels and comparing this count with a given threshold value. If the count is larger than the threshold value, the original is judged as a color original. Otherwise, it is judged as a monochrome original. In this case, when an original size or a read magnification is changed using a threshold value as a fixed value, the number of color pixels before the change may be different from that after the change. Therefore, accurate original judgement may not be properly performed.

When an original having black characters and a light undercolor is taken into consideration, a user occasionally wishes a system to judge the original as a color or monochrome original. In this case, however, the user cannot reset a degree of judgement.

When a monochrome original is misjudged as a color original, the following problems are posed.

When a monochrome original is copied by overlapping color inks (CMY) in a color copying machine, readability of characters, lines, and dots is degraded due to color misregistration and spectral characteristics of the inks.

In addition to poor print quality, transmission time of three primary colors is prolonged and the communication cost is increased in a color facsimile machine although a monochrome original is transmitted.

Although a color ruled original such as section paper and an original with a red seal are apparently color originals, the user wishes the color facsimile machine to intentionally judge it as a monochrome original because he frequently transmits these originals.

The following problems are also posed. For example, when an original having a black character on colored paper having a saturation distribution in a hatched portion in FIG. 42 is taken into consideration, the user wishes the system to judge it as a monochrome original. In addition, a color original has a low saturation in the saturation distribution indicated by the hatched portion in FIG. 42, the user wishes the system to judge it as a color original. It is very difficult to judge an original having a low saturation. When the monochrome original is misjudged as a color original, the same problems as described above occur.

When a monochrome original with a red underline is taken into consideration, a ratio of the number of pixels of a red line to that of all pixels of the original is very low, and this monochrome original is misjudged as a color original or is properly judged as a monochrome image, depending on the length of the underline. When the monochrome original is misjudged as a color original, the same problems described above occur.

SUMMARY OF THE INVENTION

The present invention has been made in consideration of the above situation, and has as its object to provide a method of processing an image, capable of accurately judging an input image as a color or monochrome image.

In order to achieve the above object of the present invention, there is disclosed a method of processing an image, comprising the steps of converting input color image data into chromaticity data and lightness data, and performing monochrome/color judgement of the one-frame input color image data in accordance with the chromaticity data and the lightness data.

There is also disclosed a method of processing an image, comprising the step of performing monochrome/color judgement of input color image data in accordance with a frequency distribution of saturation of each pixel which is obtained from the input color image data.

It is another object of the present invention to provide an image processing apparatus having various editing functions.

In order to achieve this object of the present invention, there is disclosed an image processing apparatus comprising:

a) judging means for performing chromatic/achromatic judgement of an input color signal;

b) processing means for changing an image magnification represented by the input color signal; and c) control means for changing a judgement parameter of the judging means in accordance with the magnification.

It is still another object of the present invention to accurately perform monochrome/color judgement.

In order to achieve this object of the present invention, there is disclosed an image processing apparatus comprising:

means for separating an input color signal into a lightness signal and a chromaticity signal; and judging means for performing chromatic/achromatic judgement of each predetermined area in accordance with the chromaticity signal.

There is also disclosed an image processing apparatus comprising:

means for converting an input color signal into a lightness signal and a chromaticity signal;

judging means for performing chromatic/achromatic judgement in accordance with the chromaticity signal; and control means for excluding a predetermined color from judgement objects.

The above and other objects, features, and advantages of the present invention will be described in detail with reference to the following detailed description in conjunction with the accompanying drawings and the appended claims.

BRIEF DESCRIPTION OF THE DRAWINGS

FIG. 15 is a block diagram of a histogram calculation unit;

FIG. 16 is a histogram table;

FIG. 17 is a flow chart showing a processing flow;

FIGS. 28A and 28B are views for explaining pixel correction processing;

DETAILED DESCRIPTION OF THE PREFERRED EMBODIMENTS (First Embodiment)

Figure 1:
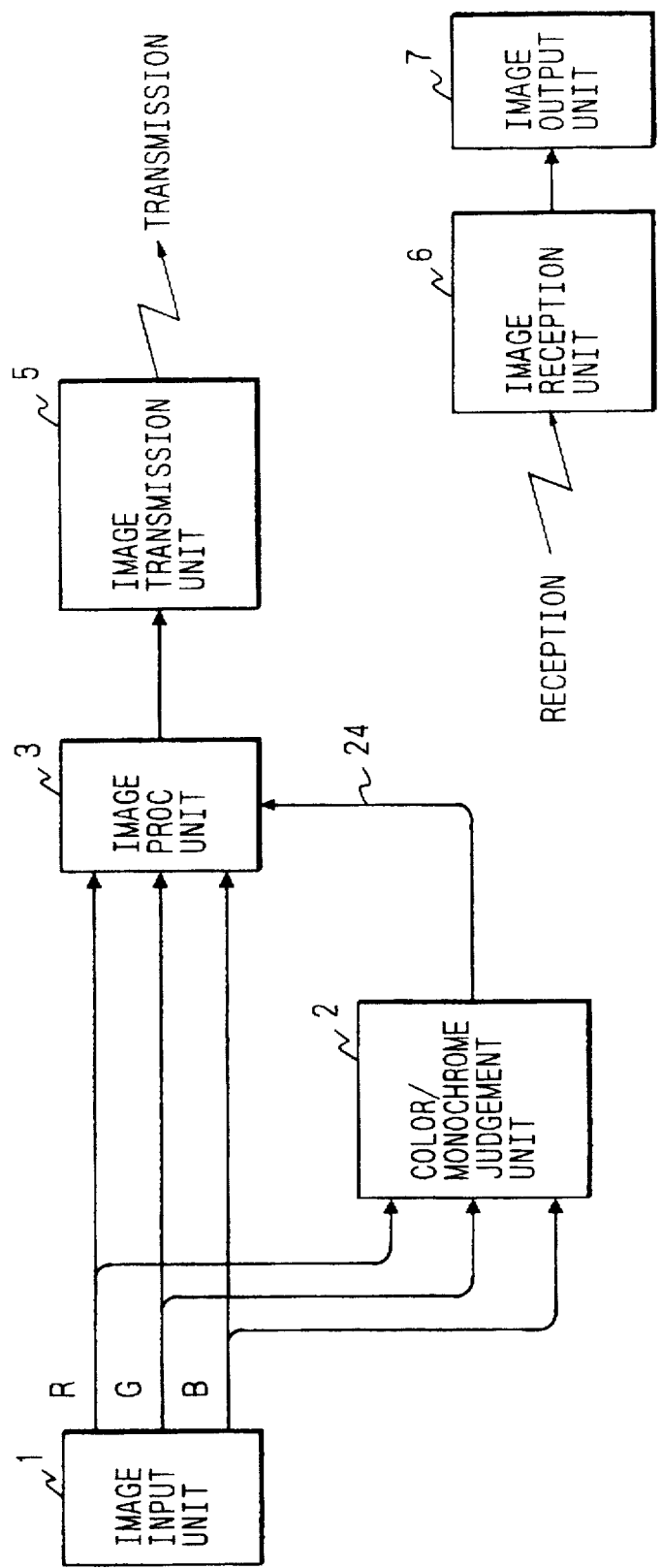
FIG. 1 is a block diagram showing an arrangement of an image processing apparatus according to the first embodiment of the present invention.

FIG. 1 is a block diagram showing an overall arrangement of an image processing apparatus according to the present invention. Referring to FIG. 1, the image processing apparatus includes an image input unit 1 such as a scanner constituted by R, G, and B CCD line sensors, a color/monochrome judgement unit 2 for outputting a color/monochrome judgement signal 24 in response to an RGB input signal, and an image processing unit 3 for performing image processing of the R, G, and B input signals in accordance with the color/monochrome judgement signal 24. For example, when an input image is judged as a monochrome image, the image processing unit 3 generates a monochrome or black signal from the R, G, and B signals and supplies the black signal together with the color/monochrome judgement signal 24 to an image transmission unit 5. The image transmission unit 5 serves as a facsimile transmission unit which performs predetermined encoding and transmitting a color or monochrome image. An image signal transmitted onto a public telephone line or the like is decoded by an image reception unit 6. The decoded signal is output to an image output unit 7 such as a color laser beam printer, a color ink-jet printer, or a color thermal printer. In this case, image reproduction using black is performed for the monochrome image.

Figure 2:
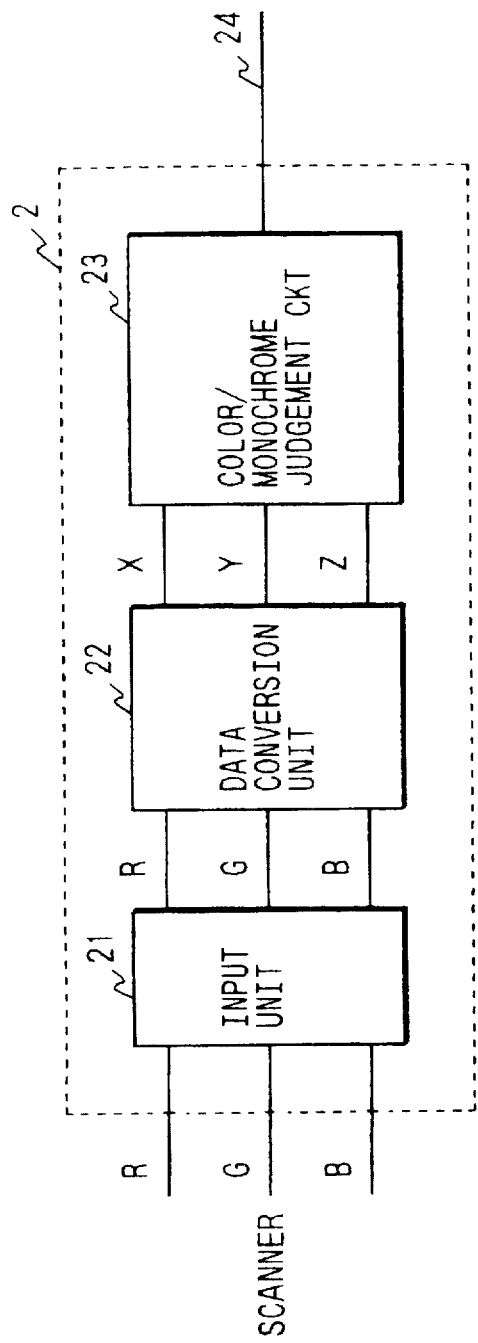
FIG. 2 is a block diagram showing an arrangement of a color/monochrome judgement unit 2.

FIG. 2 is a block diagram showing the color/monochrome judgement unit 2. R, G, and B image data are input from the image input unit 1 to an input unit 21, so that data are sent to a data conversion unit 22 in units of pixels.

The data conversion unit 22 converts the input pixel data into X, Y, and Z tristimulus values of the CIE XYZ display color system, and the converted values are input to a color/monochrome judgement circuit 23.

The color/monochrome judgement circuit 23 will be described in detail.

Figure 3:
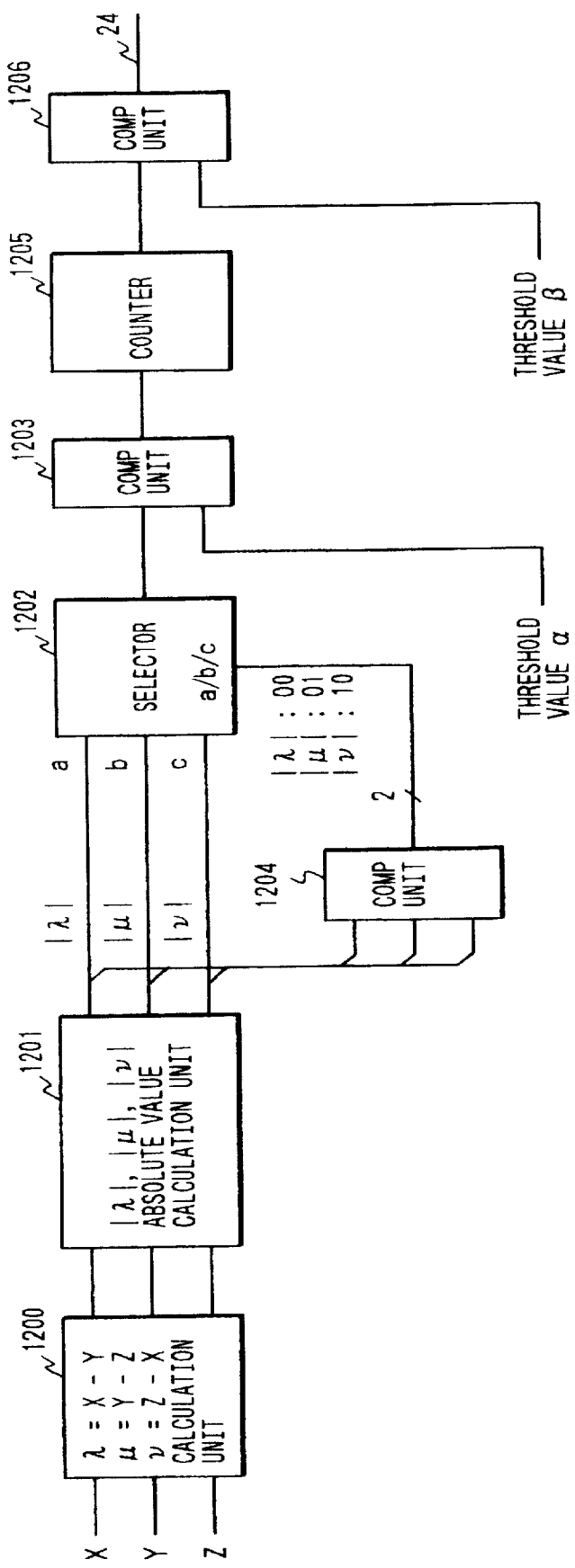
FIG. 3 is a block diagram showing an arrangement of a color/monochrome judgement circuit 23.

FIG. 3 is a block diagram showing an arrangement of the color/monochrome judgement circuit 23. A calculation unit 1200 performs signed calculations $\lambda=X-Y$, $\mu=Y-Z$, and $\nu=Z-Y$ by using tristimulus values X, Y, and Z. Absolute values of $\lambda$, $\mu$, and $\nu$ are calculated by a $|\lambda|$, $|\mu|$, $|\nu|$ absolute value calculation unit 1201. A comparison unit 1204 selects the largest one of the $|\lambda|$, $|\mu|$, and $|\nu|$ absolute values and outputs a code (2-bit code in FIG. 3) representing the largest absolute value. A selector 1202 outputs a largest one of the differences between X, Y, and Z. A comparison unit 1203 compares the output from the selector 1202 with a preset threshold value $\alpha$. When the output from the selector 1202 exceeds the threshold value, the comparison unit 1203 outputs a color judgement signal of the corresponding pixel. This color judgement signal is counted by a counter 1205. For example, if the count of the color judgement signals is 1, an input image is judged as a color image. If the count is a predetermined number of color judgement signals, the input image is not judged as a color image. In this manner, the output from the counter 1205 is compared with a threshold value $\beta$ in a comparison unit 1206, thereby finally determining an original judgement signal (color/monochrome judgement signal) 24.

(Second Embodiment)

Figure 4:
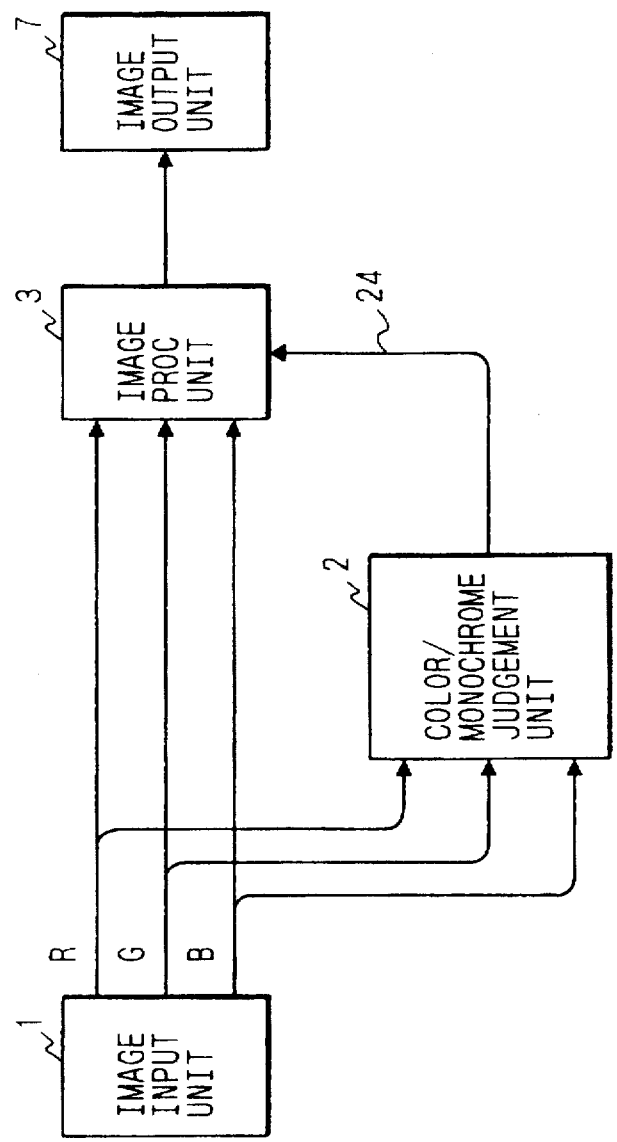
FIG. 4 is a block diagram showing an arrangement of an image processing apparatus according to the second embodiment of the present invention.

FIG. 4 is a block diagram showing an arrangement obtained when the present invention is applied to an image processing apparatus operated without performing image data transmission/reception, e.g., a copying machine. The operations of the respective circuit components are the same as those in FIG. 1, and a detailed description thereof will be omitted.

In the above embodiment, the tristimulus values X, Y, and Z of the CIE XYZ display color system are used. However, R, G, and B of the NTSC system, or Y, M, and C as complementary colors of R, G, and B, or other signals may be used in place of the above tristimulus values.

In the above embodiment, an input image is judged as a color or monochrome image in accordance with the tristimulus values X, Y, and Z of the CIE XYZ display color system obtained from the input image. That is, in a monochrome image, since differences between the X, Y, and Z values are relatively small, a given pixel of this monochrome image is judged as a monochrome pixel if a difference does not exceed the threshold value.

A comparing means is arranged to judging an original as a color original if a ratio (the number of color pixels) of color pixels to all the pixels of an input image of this original exceeds a predetermined value, thereby judging a color/monochrome original.

More specifically, by arranging the following means:

① a means for calculating differences between tristimulus values A, B, and C representing colors as follows:

$$\lambda=A-B, \mu=B-C, \nu=C-A$$

② a means for calculating the absolute values $|\lambda|$, $|\mu|$, and $|\nu|$ of the differences;

③ a means for selecting the maximum value of the three absolute values $|\lambda|$, $|\mu|$, and $|\nu|$;

④ a means for comparing the maximum value with the threshold value a and outputting the color judgement signal when the maximum value is larger than the threshold value; and ⑤ a means for counting the number of output color judgement signals, comparing the count with the threshold value $\beta$, and outputting the color original judgement signal when the count exceeds the threshold value $\beta$.

Automatic color/monochrome original judgement can be performed. As a result, the following effects are obtained:

① in color copying, a monochrome original can be automatically printed in only black, and print quality can be improved.

② in color facsimile transmission, since automatic switching between one-color data for a monochrome original and three- or four-color data for a color original can be performed, the transmission cost can be reduced, and the print quality can be improved.

As described above, according to the embodiments of the present invention, color/monochrome judgement of an input image can be accurately performed.

Figure 7:
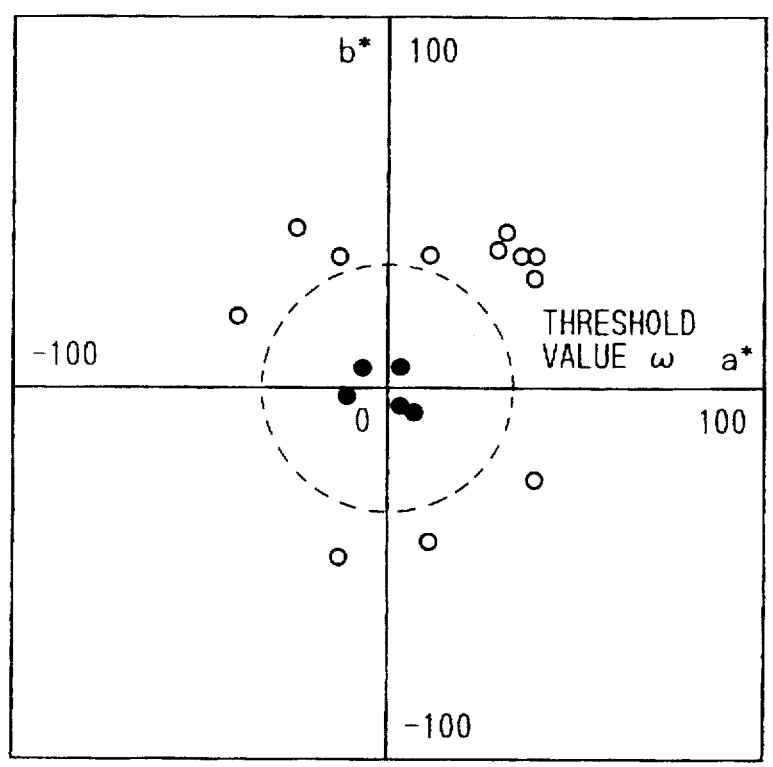
FIG. 7 is an a*b* chromaticity diagram.

FIG. 7 is a view showing the principle of still another embodiment according to the present invention. An original is read by a color scanner, and positions of the read data in an L*a*b* uniform perceptual space are plotted on the a*b* chromaticity diagram. No consideration is made for L* of the plotted chromaticity points.

For example, a color portion of the original is distributed in an area represented by hollow dots (○) in FIG. 7, and a white paper portion and a black character are distributed in an area represented by black dots (●). A threshold value $\omega$ is given. When a predetermined number of pixels having values larger (outside the dotted circle) than the threshold value $\omega$ are present, this original is judged as a color original. However, if only pixels having values smaller (inside the dotted circle) than the threshold value $\omega$ are present, this original is judged as a monochrome original.

The third to fifth embodiments of the present invention are arranged on the basis of the above principle.

(Third Embodiment)

The overall arrangement and the data flow of the apparatus of this embodiment are identical to those in FIGS. 1 and 2.

Figure 5:
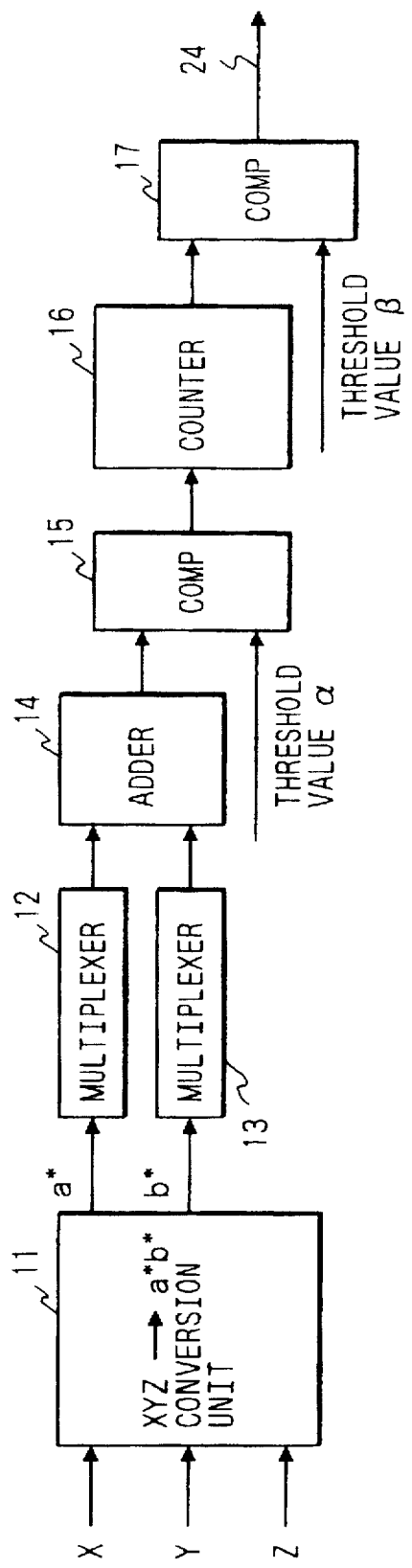
FIG. 5 is a block diagram showing an arrangement of a color/monochrome judgement circuit according to the first embodiment of the present invention.

FIG. 5 is a block diagram showing a detailed arrangement of the color/monochrome judgement circuit shown in FIG. 2. The color/monochrome judgement circuit includes an XYZ→a*b* conversion unit 11. The three color-separated signals obtained by reading an original by a scanner are converted into tristimulus value data X, Y, and Z of the CIE XYZ display color system by a data conversion unit 22. The X, Y, and Z data are input to the conversion unit 11 and are converted into a* and b* data by the following equations.

The a* and b* values are calculated by the following equations using the tristimulus values X, Y, and Z complying with JIS Z 8722 and JIS Z 8727 standards:

$$\left. \begin{array}{l} a^* = 500\left[(X/X_n)^{\frac{1}{3}} - (Y/Y_n)^{\frac{1}{3}}\right] \\ b^* = 200\left[(Y/Y_n)^{\frac{1}{3}} - (Z/Z_n)^{\frac{1}{3}}\right] \\ \text{for} \\ X/X_n > 0.008856 \\ Y/Y_n > 0.008856 \\ Z/Z_n > 0.008856 \end{array} \right\} \quad (1)$$

where a* and b* are chromaticness indices in the L*a*b* display color system, X, Y, and Z are tristimulus values of the XYZ system, and $X_n, Y_n$, and $Z_n$ are tristimulus values of the XYZ system on a perfect diffusion/reflection surface (wherein if $X/X_n$, $Y/Y_n$, or $Z/Z_n$ represents a value smaller than 0.008856, a calculation is performed by substituting a term of a cubic root of each equation (1) with $7.787(X/X_n)$ +16/116, $7.787(Y/Y_n)$+16/116, or $7.787(Z/Z_n)$+16/116.)

Multipliers 12 and 13 calculate square values $(a^*)^2$ and $(b^*)^2$ of the input signals a* and b*, respectively. These square values are input to an adder 14, and the adder 14 calculates $(a^*)^2+(b^*)^2$. A sum is input to a comparator 15. The comparator 15 compares the threshold value α with the sum $(a^*)^2+(b^*)^2$. If $(a^*)^2+(b^*)^2>\alpha$, then the comparator 15 outputs "1" data. If an input pixel has a saturation value larger than a given saturation value, i.e., a threshold value, the output from the comparator 15 is set at "1". Otherwise, the comparator 15 outputs "0" data.

When the input pixel has a saturation value larger than the threshold value, the input pixel is judged as a color pixel.

The color pixel judgement signal is counted by a counter 16. Whether an input original is judged as a color original is determined by a count n of output color pixel judgement signals of level "1". For example, the input original is judged as a color original by a count of "1" or a predetermined number of output color pixel judgement signals. This determination is performed by properly setting the threshold value β.

A comparator 17 compares the count n of the color pixel judgement signals with the threshold value β and outputs a color original judgement signal when the count n is larger than the threshold value.

The threshold values α and β are properly set by a CPU (not shown).

Figure 6:
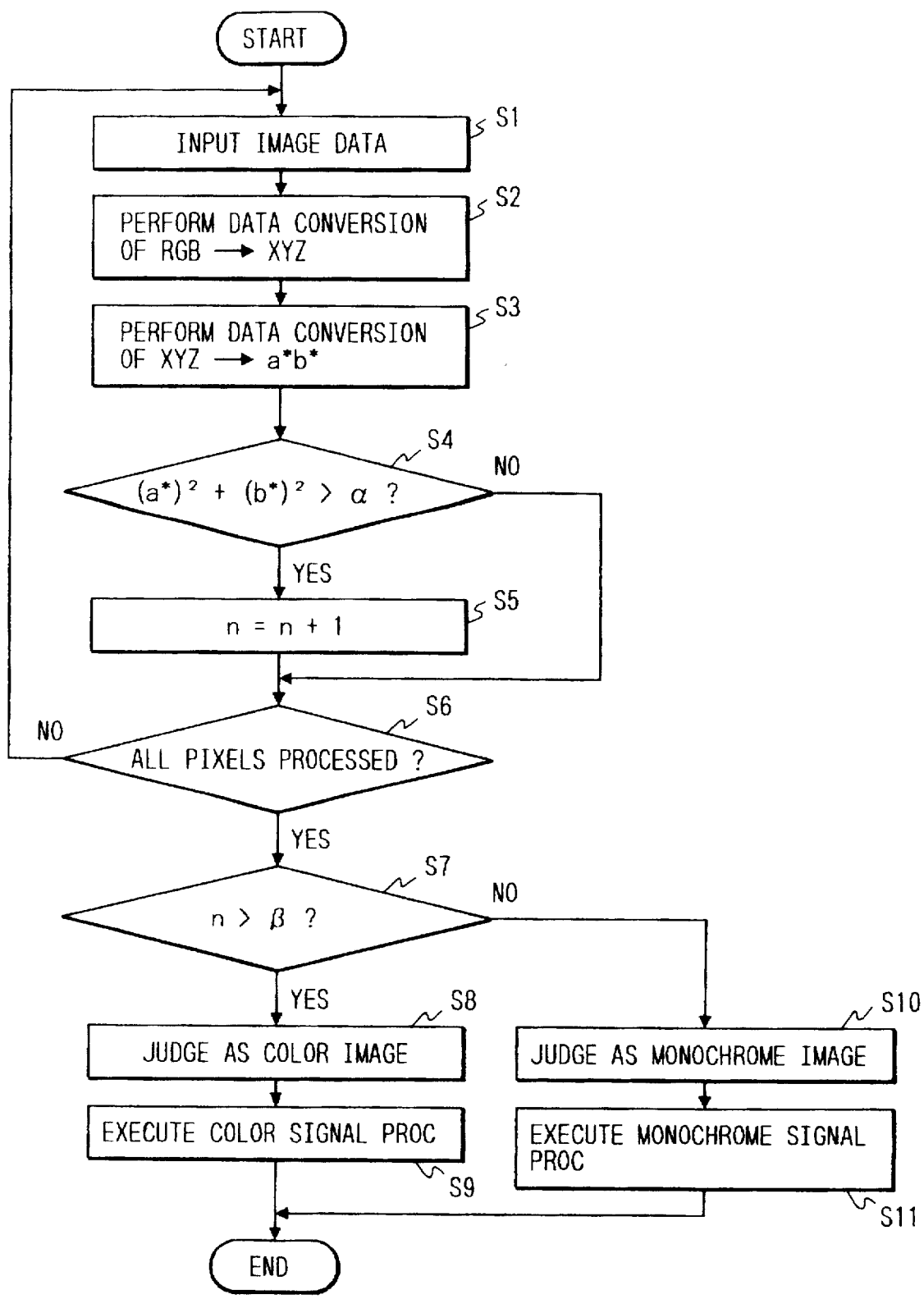
FIG. 6 is a flow chart showing a processing flow of the first embodiment of the present invention.

The above processing will be described with reference to a flow chart in FIG. 6.

R, G, and B data are input in units of pixels (S1) and are converted into X, Y, and Z data by the data conversion unit 22 (S2). The X, Y, and Z data are then converted into a* and b* data by the XYZ→a*b* conversion unit 11 (S3). A sum $(a^*)^2+(b^*)^2$ is calculated by the multipliers 12 and 13 and the adder 14 and is compared with the predetermined threshold value α (S4). If condition $(a^*)^2+(b^*)^2>\alpha$ is satisfied, the input pixel is determined as a color pixel, and the value of the counter 16 is incremented by one (S5). Otherwise, the input pixel is determined as a monochrome pixel. This processing is performed for all predetermined pixels (S6). When a count n of the counter 16 is larger than the predetermined threshold value β, the input image is judged as a color image (S8), and color signal processing is performed (S9). However, when the count n is smaller than the threshold value β, the input image is judged as a monochrome image (S10), and monochrome signal processing is performed (S11).

The a* and b* signals may be directly extracted from the R, G, and B signals, thereby simplifying the circuit arrangement.

Monochrome/color judgement need not be performed for all pixels constituting an original, but can be performed every predetermined number of pixels.

When a pixel to be judged as a color pixel is detected, the judgement flow may be ended. In this case, the judgement time can be shortened.

(Fourth Embodiment)

L*a*b* conversion is utilized to separate the image data into the lightness signal and the chromaticity signal in the third embodiment. However, a conversion scheme is not limited to this. For example, image data may be converted into Y, I, and Q signals used in a color television system. That is, the XYZ→a*b* conversion unit in FIG. 5 is replaced with an XYZ→YIQ conversion unit to perform conversion in the same arrangement as in the third embodiment. In this case, XYZ→YIQ conversion can be performed by the following equations:

① CIE XYZ→NTSC RGB $R=1.9106X-0.5326Y-0.2883Z$ $G=-0.9843X+1.9984Y-0.0283Z$ $B=0.0584X-0.1185Y+0.8985Z$

② NTSC RGB→YIQ $Y=0.30R+0.59G+0.11B$ $I=0.60R-0.28G-0.32B$ $Q=0.21R-0.52G+0.31B$

However, the color components are not limited to the Y, I, and Q components, but can be replaced with L*, u*, and v* components.

(Fifth Embodiment)

The block diagram showing an arrangement of the fifth embodiment is the same as in FIG. 5.

The third embodiment exemplifies a color facsimile machine for performing image transmission. However, this embodiment exemplifies a copying machine which does not perform image transmission to an external device. In particular, the copying machine performs monochrome/color original judgement by prescanning. In main scanning, four-color (Y, M, C, and K) or three-color (Y, M, C) print processing is performed for a color image, and print processing in only black is performed for a monochrome image. Therefore, the processing speed for a monochrome image can be increased, and color misregistration can be prevented.

According to this embodiment, the following means are provided:

① a means for separating color-separated data sent from a scanner into chromaticity information data and lightness information data;

② a means for generating saturation information data from the chromaticity information data and judging an input pixel as a color pixel if the saturation information data is larger than the threshold value; and ③ a means for judging an original as a color original when a ratio of color pixels to all pixels of an input original is the threshold value or more.

Automatic color/monochrome original judgement can be performed, and the following effects can be obtained:

① in color copying, a monochrome original can be automatically printed in only black, and print quality can be improved.

② in color facsimile transmission, a monochrome original can be automatically transmitted in only black, the cost can be reduced, and the print quality can be improved.

The principle of the sixth to eighth embodiments of the present invention will be described below.

<Principle 1>

Figure 10:
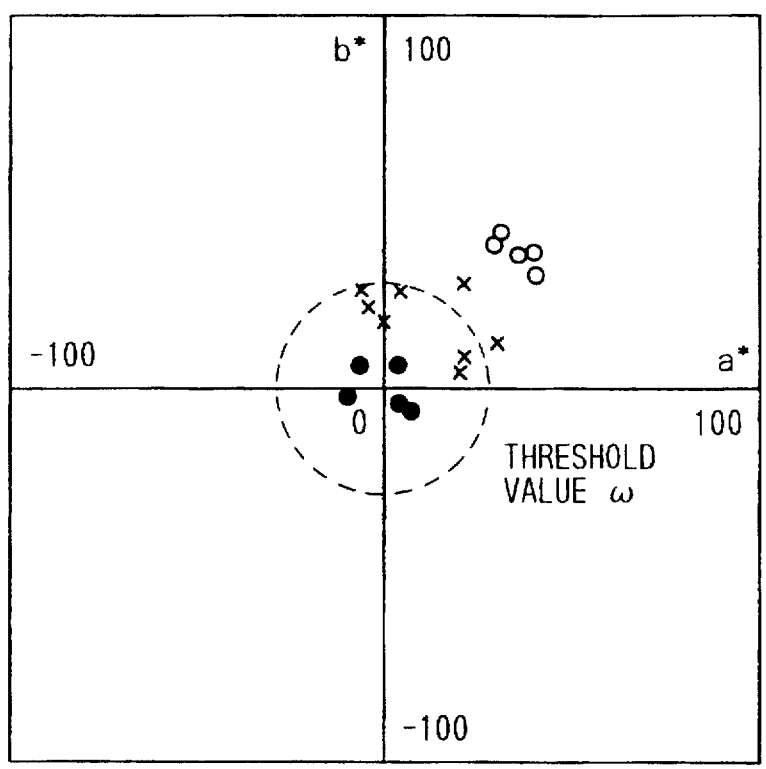
FIGS. 10, 11A, and 11B are a*b* chromaticity diagrams.

FIG. 10 shows the principle of the sixth to eighth embodiments.

An original is read by a color scanner, and positions of the read data in the uniform perceptual space are plotted in the a*b* chromaticity diagram. No consideration is made for L* of the plotted chromaticity points.

For example, assume that a red line is drawn on a monochrome original (black characters on white paper). Red line pixels are distributed in an area represented by hollow dots. Variations are found in data due to read errors and the like by an image input means such as a scanner. A white paper portion is distributed in an area represented by black dots and is judged to include pixels having a low saturation (i.e., colorless). A black character of the original is distributed in a large area represented by crosses (x) in FIG. 10. Although achromatic pixels are distributed as pixels having colors due to the following reason.

When tristimulus data X, Y, and Z of the CIE XYZ display color system of an input pixel are achromatic, condition X=Y=Z must be satisfied, but variations are caused by read errors of the scanner or the like. In particular, an error of a color having small lightness and saturation values in a black character, a black line or the like is extremely larger than that of the white color in the a*b* calculation result because the X, Y, and Z values are small and data variations occur.

In order to judge an input original as a color or monochrome original, when a pixel located outside an area defined by a dotted line, i.e., a threshold value ω in FIG. 10 is defined as a chromatic pixel, since the red line pixel is located outside the area defined by the dotted line, the original having the red line is appropriately judged as a color original.

In a normal monochrome original having no red line, a black character line may be distributed outside the area indicated by the dotted line. As a result, a monochrome original may be misjudged as a color original.

If a condition is given such that an input original is not judged as a color original even if an image portion is distributed outside the area represented by the dotted line, the judgement error can be prevented.

The following embodiments are arranged on the basis of the above principle.

(Sixth Embodiment)

The block diagram showing the overall arrangement of the image processing apparatus of this embodiment and a data flow are shown as in FIGS. 1 and 2, respectively.

Figure 8:
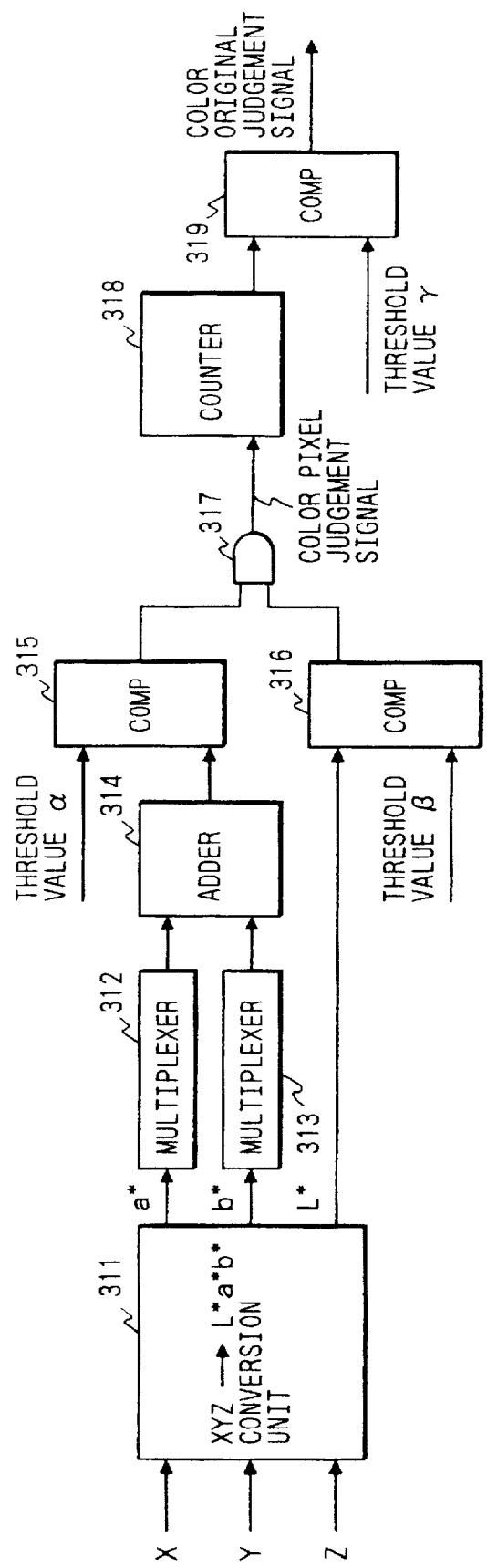
FIG. 8 is a block diagram showing an arrangement of a color/chromaticity judgement circuit according to the sixth embodiment of the present invention.

FIG. 8 is a block diagram showing a detailed arrangement of the color/monochrome judgement circuit in FIG. 2. The color/monochrome judgement circuit includes an XYZ→L*a*b* conversion unit 311. Three color-separated signals obtained by reading an original by a scanner are converted into tristimulus value data X, Y, and Z of the CIE XYZ display color system by a data conversion unit 322. The X, Y, and Z data are input to the data conversion unit 311 and are converted into L*, a*, and b* data in accordance with the following equations.

The L*, a*, and b* values are calculated by the following equations using the tristimulus values X, Y, and Z complying with the JIS Z 8722 and JIS Z 8727 standards.

$$L^* = 116 \, (Y/Y_n)^{\frac{1}{3}} - 16 \quad (1)$$
for
$$Y/Y_n > 0.008856$$

$$\left. \begin{array}{l} a^* = 500 \, [(X/X_n)^{\frac{1}{3}} - (Y/Y_n)^{\frac{1}{3}}] \\ \text{for} \\ X/X_n > 0.008856 \\ b^* = 200 \, [(Y/Y_n)^{\frac{1}{3}} - (Z/Z_n)^{\frac{1}{3}}] \\ \text{for} \\ Y/Y_n > 0.008856 \\ Z/Z_n > 0.008856 \end{array} \right\} \quad (2)$$

where a* and b* are chromaticness indices in the L*a*b* display color system, X, Y, and Z are tristimulus values of the XYZ system, and $X_n$, $Y_n$, and $Z_n$ are tristimulus values of the XYZ system on a perfect diffusion/reflection surface (wherein if $Y/Y_n$ is 0.008856 or less, L* is obtained by the following equation:

$$L^* = 903.29(Y/Y_n)$$

and if $X/X_n$, $Y/Y_n$, or $Z/Z_n$ represents a value smaller than 0.008856, a calculation is performed by substituting a term of a cubic root of each equation (1) with $$7.787(X/X_n)+16/116,$$

$$7.787(Y/Y_n)+16/116,$$

or $$7.787(Z/Z_n)+16/116.)$$

Multipliers 312 and 313 calculate square values (a*)² and (b*)² of the input signals a* and b*, respectively. These square values are input to an adder 314, and the adder 314 calculates (a*)²+(b*)². A sum is input to a comparator 315. The comparator 15 compares the threshold value α with the sum (a*)²+(b*)². If (a*)²+(b*)²>α, then the comparator 315 outputs "1" data. If an input pixel has a saturation value larger than a given saturation value, i.e., a threshold value, the output from the comparator 315 is set at "1". Otherwise, the comparator 315 outputs "0" data. The lightness data L* output from the XYZ→L*a*b* conversion unit 311 is input to a comparator 316. The comparator 316 compares the lightness data L* with a threshold value β. If condition L*>β is established, the comparator 316 outputs "1" data. If the input pixel has a lightness value larger than a threshold value, the comparator 316 outputs "1" data. Otherwise, it outputs "0" data.

An AND gate 317 calculates a logical product of the data from the comparators 315 and 316 and outputs a color/monochrome judgement signal. That is, when a pixel has large saturation and lightness values, this pixel is judged as a color pixel.

A color pixel judgement signal is counted by a counter 318. Whether an input original is judged as a color original is determined by a count n of output color pixel judgement signals of level "1". For example, the input original is judged as a color original by a count of "1" or a predetermined number of output color pixel judgement signals. This determination is performed by properly setting the threshold value γ.

A comparator 319 compares the count n of the color pixel judgement signals with the threshold value γ and outputs a color original judgement signal when the count n is larger than the threshold value.

The threshold values α, β, and γ are properly set by a CPU (not shown).

Figure 9:
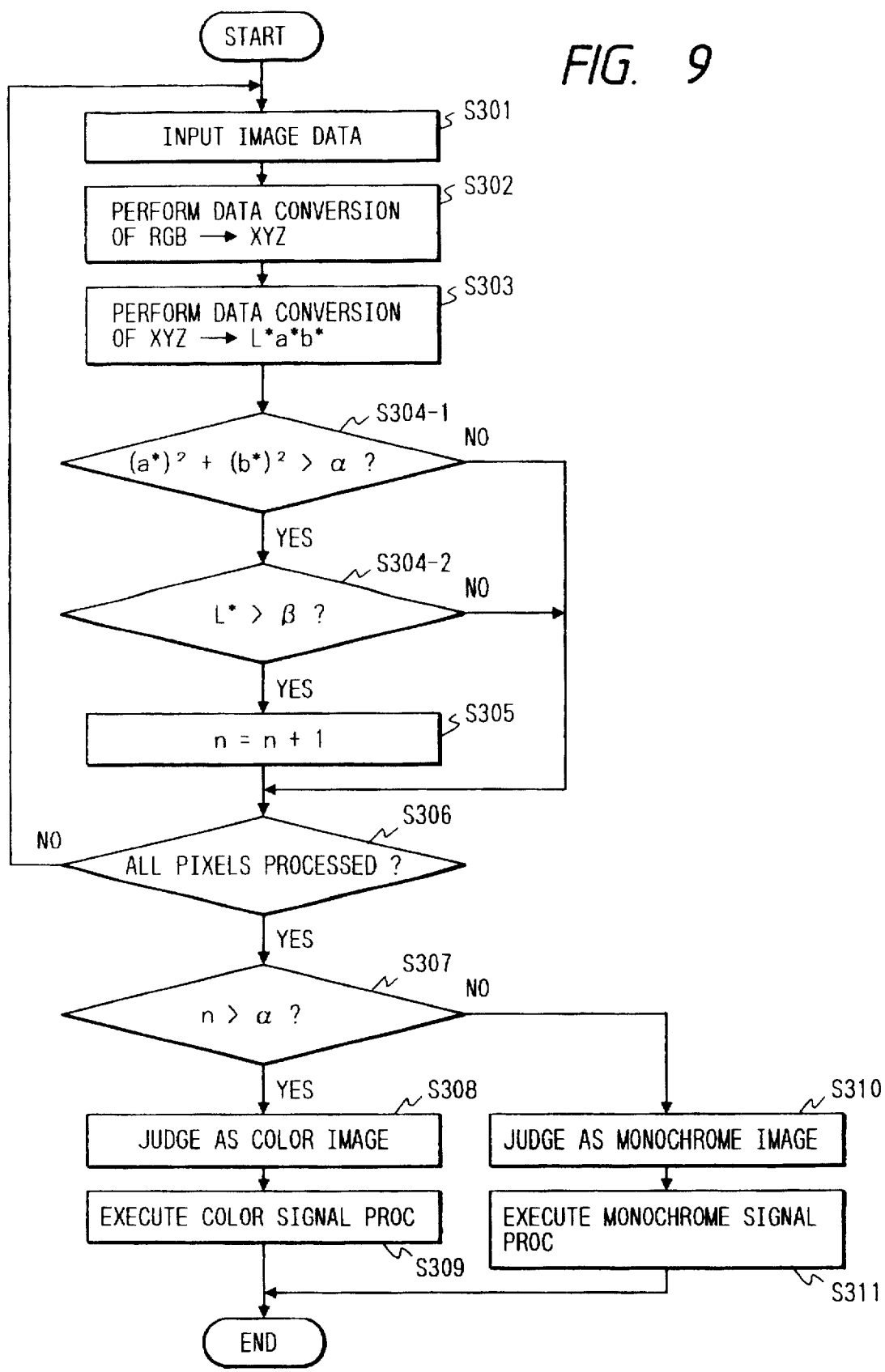
FIG. 9 is a flow chart showing a processing flow according to the sixth embodiment of the present invention.

The above processing will be described with reference to a flow chart in FIG. 9.

R, G, and B data are input in units of pixels (S301) and are converted into X, Y, and Z data by the data conversion unit 322 (S302). The X, Y, and Z data are then converted into L*, a*, and b* data by the XYZ→L*a*b* conversion unit 311 (S303). A sum $(a^*)^2+(b^*)^2$ is calculated by the multipliers 312 and 313 and the adder 314 and is compared with the predetermined threshold value α (S304-1). If condition $(a^*)^2+(b^*)^2 > α$ is satisfied, it is judged whether condition L*>β is satisfied (S304-2). If condition L*>β is satisfied, the input pixel is determined as a color pixel, and the value of the counter 318 is incremented by one (S305). Otherwise, the input pixel is determined as a monochrome pixel. This processing is performed for all predetermined pixels (S306). When a count n of the counter 318 is larger than the predetermined threshold value β (S307), the input image is judged as a color image (S308), and color signal processing is performed (S309). However, when the count n is smaller than the threshold value β, the input image is judged as a monochrome image (S310), and monochrome signal processing is performed (S311).

The L*, a*, and b* signals may be directly extracted from the R, G, and B signals, thereby simplifying the circuit arrangement.

Monochrome/color judgement need not be performed for all pixels constituting an original, but can be performed every predetermined number of pixels.

When a pixel to be judged as a color pixel is detected, the judgement flow may be ended. In this case, the judgement time can be shortened.

(Seventh Embodiment)

L*a*b* conversion is utilized to separate the image data into the lightness signal and the chromaticity signal in the sixth embodiment. However, a conversion scheme is not limited to this. For example, image data may be converted into Y, I, and Q signals used in a color television system. That is, the XYZ→L*a*b* conversion unit in FIG. 8 is replaced with an XYZ→YIQ conversion unit to perform conversion in the same arrangement as in the sixth embodiment. In this case, XYZ→YIQ conversion can be performed by the following equations:

① CIE XYZ→NTSC RGB $R=1.9106X-0.5326Y-0.2883Z$ $G=-0.9843X+1.9984Y-0.0283Z$ $B=0.0584X-0.1185Y+0.8985Z$

② NTSC RGB→YIQ $Y=0.30R+0.59G+0.11B$ $I=0.60R-0.28G-0.32B$ $Q=0.21R-0.52G+0.31B$

However, the color components are not limited to the Y, I, and Q components, but can be replaced with L*, u*, and v* components.

(Eighth Embodiment)

FIG. 10 is a block diagram showing an arrangement of the eighth embodiment. The sixth embodiment exemplifies a color facsimile machine for performing image transmission. However, this embodiment exemplifies a copying machine which does not perform image transmission to an external device. In particular, the copying machine performs monochrome/color original judgement by prescanning. In main scanning, four-color (Y, M, C, and K) or three-color (Y, M, C) print processing is performed for a color image, and print processing in only black is performed for a monochrome image. Therefore, the processing speed for a monochrome image can be increased, and color misregistration can be prevented.

According to the sixth to eighth embodiments described above, the following circuits are provided:

① a circuit for separating color-separated data sent from a scanner into chromaticity information data and lightness information data;

② a circuit for generating saturation information data from the chromaticity information data and judging an input pixel as a color pixel if the saturation information data is larger than the threshold value;

③ a circuit for judging that a pixel has a large lightness value when the lightness information data is larger than a threshold value;

④ a circuit for judging from the above judging circuits that a pixel is a color pixel; and ⑤ a circuit for judging an original as a color original when a ratio of color pixels to all pixels of this original is the threshold value or more.

Automatic color/monochrome original judgement precision can be improved.

<Principle 2>

Figure 11A:
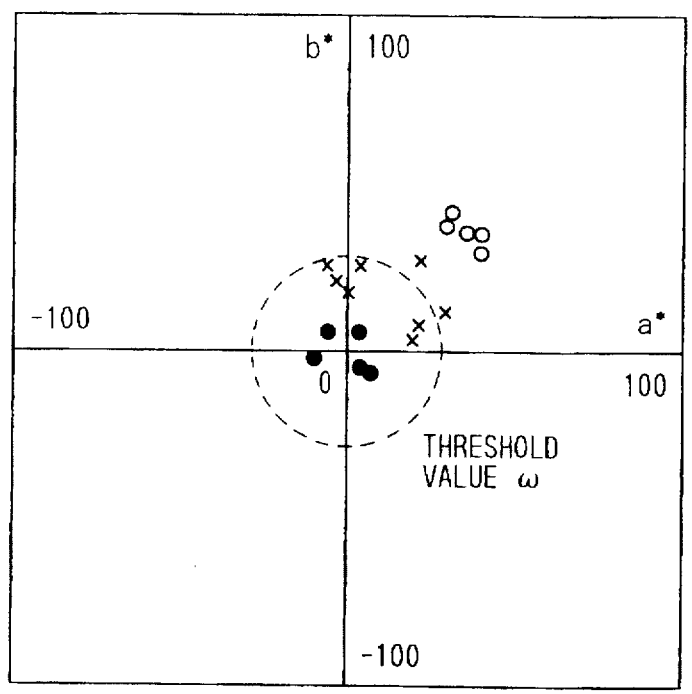
Figure 11B:
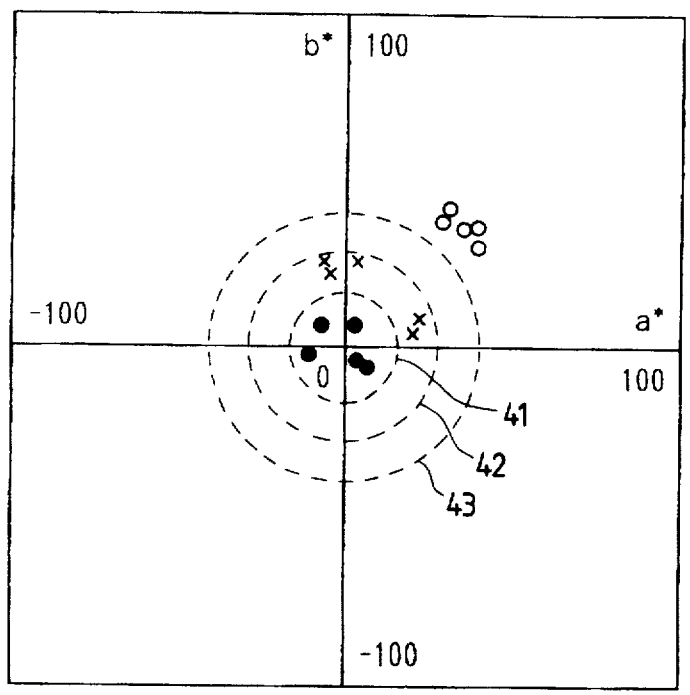

In the principle 1 described above, judgement is performed by also considering the lightness information. However, when the saturation threshold value is changed as indicated by reference numerals 41, 42, and 43 in the a*b* chromaticity diagram of FIG. 11B in accordance with the lightness, the judgement errors described above can be prevented. That is, when the lightness value is small, a threshold value ω in the a*b* chromaticity diagram of FIG. 11A is decreased. Otherwise, the threshold value ω is increased to perform optimal judgement.

The ninth embodiment is arranged on the basis of the above principle.

(Ninth Embodiment)

Figure 12:
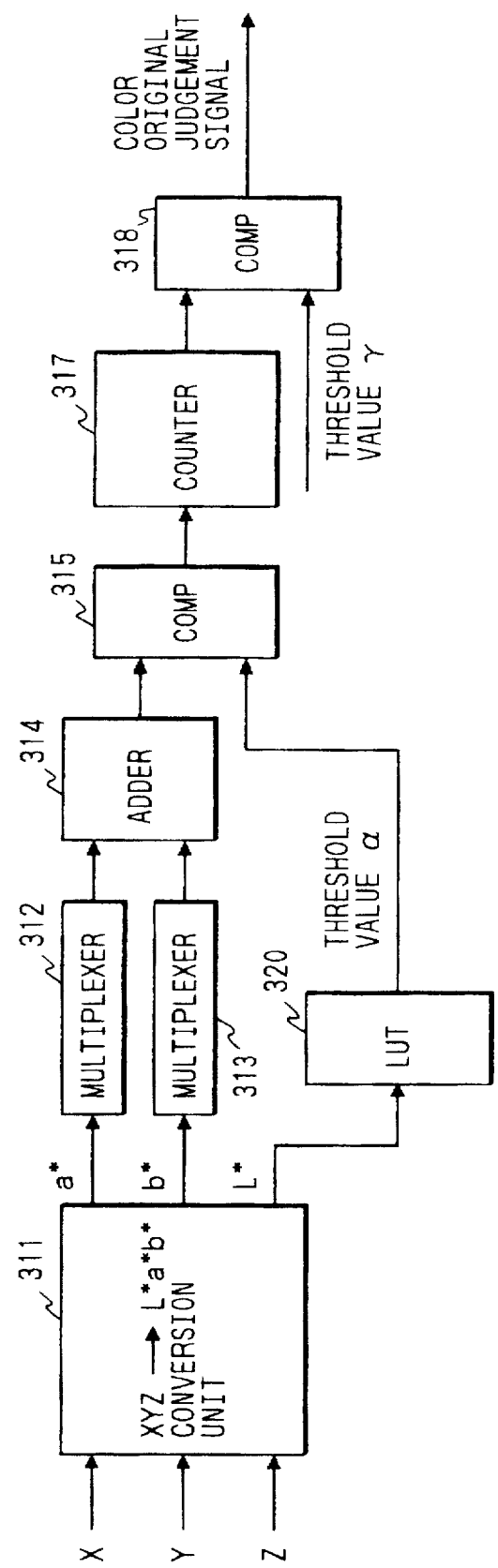
FIG. 12 is a block diagram showing an arrangement of a color/monochrome judgement circuit according to the ninth embodiment of the present invention.

Most of the part of this embodiment is the same as that of the sixth embodiment. However, as shown in FIG. 12, a threshold value a of the value of the sum $(a^*)^2+(b^*)^2$ based on the chromaticity information is changed by an LUT 320 to solve the above problem.

In this embodiment, table look-up operation is performed in the LUT 320 in accordance with the L* value. For example, when the value L* is small, a larger threshold value α is used. However, when L* is large, α is set to be a small value. Misjudgement as a "high saturation" for a black character or the like can be prevented.

More specifically, when tristimulus values are input to an XYZ→L*a*b* conversion unit 311, a saturation data value 120 is output from an adder 314. Assume that an L* value is 20. In this case, the LUT 320 outputs a value "150" predetermined in response to input data "20". A saturation threshold value is increased for data having a relatively small lightness value as L*="20". A comparator 315 compares data "120" output from the adder 314 with "150" output from the LUT 320. Since the saturation data is smaller than the threshold value, an output from the comparator 315 is set at "0". In this case, a counter 317 is not operated.

Assume that a saturation data value "80" is output from the adder 314 and that an L* value is "80". In this case, the LUT 320 outputs "50".

The operation of the LUT 320 aims at decreasing the saturation threshold value for data having a relatively large lightness value as L*="80".

The comparator 315 compares data "80" and "50" output from the adder 314 and the LUT 320. Since the saturation data is larger than the threshold value, an output from the comparator 315 is set at "1", so that the counter 317 counts this output.

When a threshold value is set as β=100 and a count of the counter 317 reaches 101, i.e., the number of times of judgement of target pixels as color pixels is 101, the comparator 318 outputs a color original judgement signal, and the read original is judged as a color original.

In this embodiment, L*a*b* conversion is used to separate the image data into the lightness and chromaticity signals. However, the conversion scheme is not limited to this. For example, the image data may be converted into Y, I, and Q signals of a color television system as in the seventh embodiment.

The ninth embodiment may be arranged as in the eighth embodiment.

In this embodiment, a table as an LUT (Look-Up Table) is used to determine the threshold value α. However, the threshold value a may be operated as a function of L* by using an operation circuit.

According to the ninth embodiment, there are provided the following circuits:

① a circuit for separating color-separated data sent from a scanner into chromaticity information data and lightness information data;

② a circuit for generating saturation information data from the chromaticity information data and judges that a target pixel is a color pixel when the saturation information data is larger than a given threshold value;

③ a circuit for changing the threshold value in accordance with the lightness information data; and ④ circuit for judging a target original as a color original when a ratio of the number of color pixels to that of all pixels exceeds a given threshold value.

With the above arrangement, color/monochrome original judgement precision can be improved.

In particular, according to the present invention, judgement precision can be greatly improved because both the lightness information and the chromaticity information are used in monochrome/color judgement in units of pixels.

Automatic color/monochrome original judgement can be performed, and the following effects can be obtained:

① in color copying, a monochrome original can be automatically printed in only black, and print quality can be improved.

② in color facsimile transmission, a monochrome original can be automatically transmitted in only black, the cost can be reduced, and the print quality can be improved.

The third principle of the following embodiments will be described below.

<Principle 3>

Figure 18C:
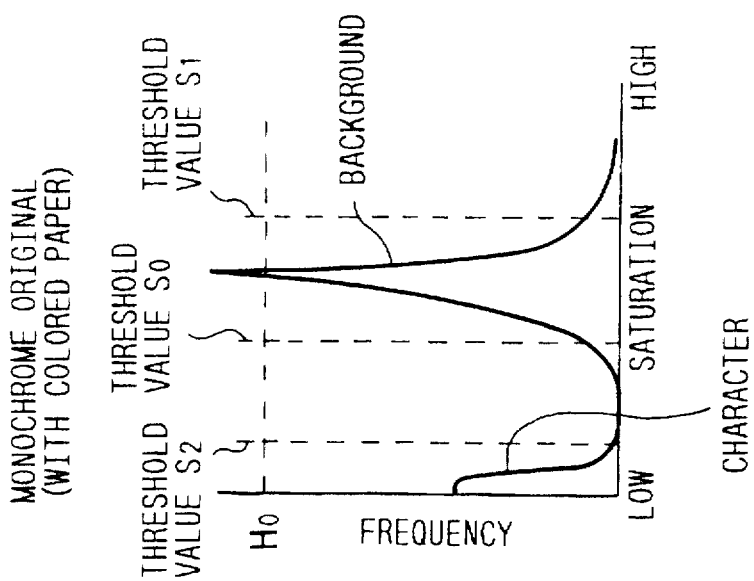
FIGS. 18A to 18C are saturation histograms of the respective originals.
Figure 18B:
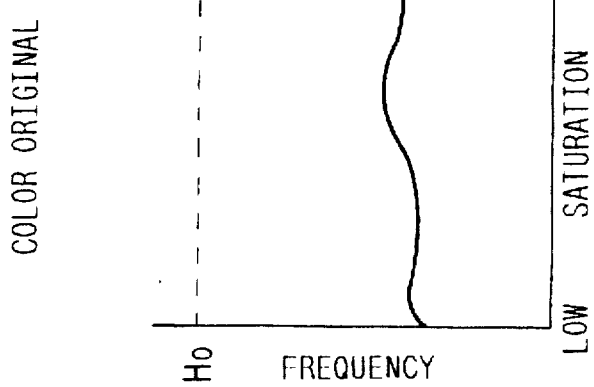
Figure 18A:
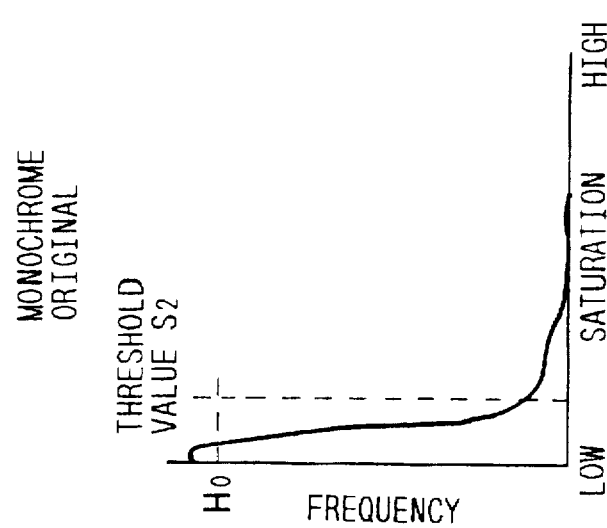

When an original is read by a scanner or the like, frequency distributions of the saturation values of the respective pixels are shown in FIGS. 18A, 18B, and 18C.

FIG. 18A shows the frequency distribution of a monochrome original which is achromatic. All the pixels must be distributed in the range of saturation 0. However, the actual distribution is spread due to read errors of the scanner or the like, as shown in FIG. 18A.

FIG. 18B shows the frequency distribution of a color original which includes pixels from a pixel having a low saturation to a pixel having a high saturation, thus obtaining a uniform distribution.

FIG. 18C shows the frequency distribution of a light color original having a black character, a black line, and the like. This original is to be judged as a monochrome original. An under color of the sheet tends to be distributed in a wider area than that of the black character and line, shown in FIG. 18C.

When a saturation histogram is plotted, a maximum peak is present in a range having a relatively high saturation. When the frequency of the peaks exceeds a predetermined value and another peak is present at the saturation "0", this original is judged as a monochrome original (with colored paper). In practice, the target original is judged as a monochrome original:

① when the maximum saturation peak falls within the range between a threshold value $S_0$ and a threshold value $S_1$; and ② when the second peak is a threshold value $S_2$ or less.

When paper having a light color as an under color of the original is used, an original to be judged as a monochrome original is not judged as a color original on the basis of this principle.

(Tenth Embodiment)

The block diagram showing the overall arrangement of an image processing apparatus of this embodiment is the same as that in FIG. 1.

Figure 13:
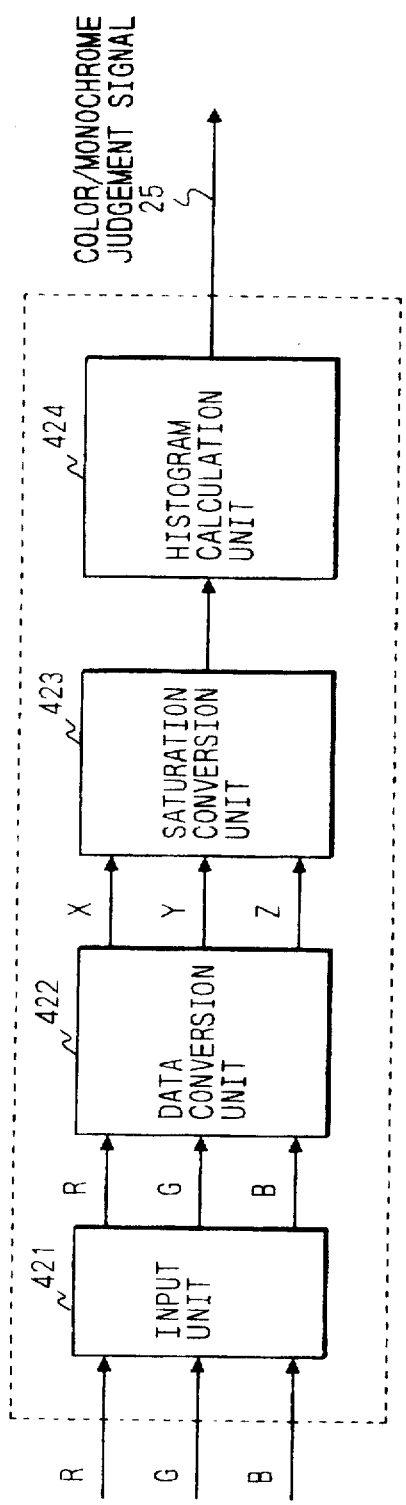
FIG. 13 is a diagram showing a data flow input from an image input unit.

FIG. 13 is a view showing a data flow.

Data is input from an image input unit 1 to an input unit 421 and is sent to a data conversion unit 422 in units of pixels. The pixel data input to the data conversion unit 422 are converted into tristimulus values X, Y, and Z represented by the CIE XYZ display color system, and the tristimulus values X, Y, and Z are input to a color/monochrome judgement circuit 423.

Saturation data is input to a histogram calculation unit 424, and a frequency distribution of the saturation data is calculated.

Figure 14:
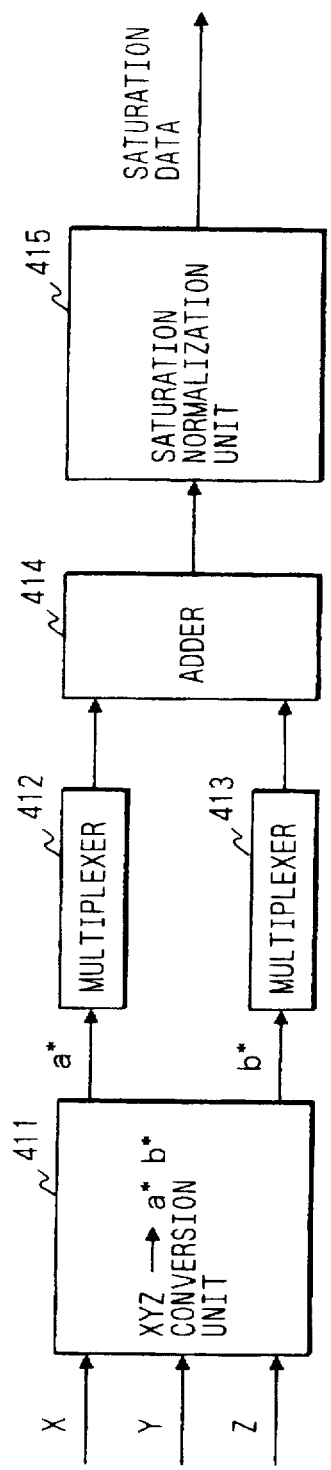
FIG. 14 is a block diagram of a saturation data calculation unit.

FIG. 14 is an XYZ→a*b* conversion unit 411 which converts the input data into a* and b* data.

The a* and b* values are calculated in accordance with the tristimulus values X, Y, and Z complying with the JIS Z 8722 and JIS Z 8727 standards as follows:

$$a^* = 500\,[(X/X_n)^{\frac{1}{3}} - (Y/Y_n)^{\frac{1}{3}}]$$
for
$$X/X_n > 0.008856$$

$$b^* = 200\,[(Y/Y_n)^{\frac{1}{3}} - (Z/Z_n)^{\frac{1}{3}}]$$
for
$$Y/Y_n > 0.008856$$
$$Z/Z_n > 0.008856$$

(1)

where a* and b* are chromaticness indices in the L*a*b* display color system, X, Y, and Z are tristimulus values of the XYZ system, and $X_n$, $Y_n$ and $Z_n$ are tristimulus values of the XYZ system on a perfect diffusion/reflection surface (wherein if $X/X_n$, $Y/Y_n$, or $Z/Z_n$ represents a value smaller than 0.008856, a calculation is performed by substituting a term of a cubic root of each equation (1) with $$7.787(X/X_n)+16/116,$$

$$7.787(Y/Y_n)+16/116,$$

or $$7.787(Z/Z_n)+16/116.)$$

Multipliers 412 and 413 calculate square values $(a^*)^2$ and $(b^*)^2$ of the input signals $a^*$ and $b^*$, respectively. These square values are input to an adder 414, and the adder 414 calculates $(a^*)^2+(b^*)^2$. A sum is input to a saturation normalization unit 415 and is normalized into 8-bit data representing any one of 0 to 255 values. In this manner, the saturation data is calculated.

The saturation data (8 bits) is sent to the histogram calculation unit 424 (to be described in detail with reference to FIG. 15). A saturation signal passing through a selector 431 serves as an address signal for a RAM 432. That is, a histogram table in FIG. 16 is constituted by a RAM. The saturation signal as the address signal of this RAM to look up the histogram table. Data addressed in the RAM appears on a data line in synchronism with a clock CLK 435. The data read out from the RAM is added by one in an adder 433. The sum data from the adder 433 is temporarily stored in a buffer 434. When the level of the sync signal CLK 436 is changed, the RAM 432 is set in a write enable state, and the buffer 435 is set in an output enable state. The data stored in the buffer 435 is output onto the data line and written in the RAM 432. The frequency table is updated every time saturation data representing one of the values 0 to 255 is input to the histogram calculation unit 424.

When all pixels of the original are read, a frequency histogram associated with the saturation data is stored in the RAM 432.

The RAM 432 is addressed from a CPU (not shown) to read out data. The CPU judges whether a maximum value M of the frequency of the histogram is larger than a predetermined value $H_0$ and whether the corresponding saturation value S falls within the range between the threshold value $S_0$ and the threshold value $S_1$, as shown in FIG. 18C or whether the saturation value S is smaller than the threshold value $S_2$, as shown in FIG. 18A. If the above conditions are satisfied, the CPU judges the input original as a monochrome original.

If the CPU judges that the maximum value M of the frequency of the histogram is smaller than the predetermined value $H_0$ or that the corresponding saturation value S falls within the range between the threshold value $S_2$ and the threshold value $S_0$ or is larger than the threshold value $S_1$, as shown in FIG. 18B, a signal representing a color original is output. In this manner, even if paper has a light color, the corresponding original can be accurately judged as a monochrome original.

The above processing sequence will be described with reference to a flow chart in FIG. 17.

R, G, and B data are input in units of pixels (S401) and are converted into $a^*$ and $b^*$ data by the XYZ→$a^*b^*$ conversion unit 411 (S403). A sum $(a^*)^2+(b^*)^2$ is calculated by the multipliers 412 and 413 and the adder 414, and normalization of the sum is performed (S404). A frequency is then counted (S405). This processing is performed for all predetermined pixels (S406), and a maximum frequency M and a corresponding saturation value S are detected (S407).

The values M and S are determined whether to be predetermined values (S408). If conditions are satisfied, the input image is judged as a monochrome image (S409), and monochrome image processing is performed (S410). However, when the input image is judged as a color image (S411), color image processing is performed (S412).

As described above, according to this embodiment, by providing the following means:

① a means for separating color-separated data sent from the scanner into chromaticity information data and the lightness information data;

② a means for generating saturation information data from the chrominance information data;

③ a means for normalizing the saturation information data;

④ a means for calculating a frequency distribution of the data obtained by the means ③; and ⑤ a means for comparing saturation data having a largest frequency value with the threshold value, an original having a certain under color or having paper with a light color can be accurately judged as a monochrome original. As a result, the following effects can be obtained:

① in color copying, a monochrome original can be automatically printed in only black, and print quality can be improved; and ② in color facsimile transmission, since a monochrome original can be automatically transmitted in only black, the transmission cost can be reduced and the print quality can be improved.

The $a^*$ and $b^*$ signals may be directly extracted from the R, G, and B signals, thereby simplifying the circuit arrangement. Monochrome/color judgement need not be performed for all pixels constituting an original, but can be performed every predetermined number of pixels.

In addition to the condition as the maximum frequency, a condition that the second peak is smaller than the threshold value $S_2$ may be added to perform judgement to improve judgement precision.

Formation of a saturation histogram is not limited to the specific one described in the above embodiment. For example, all processing operations can be performed by computer software.

(Eleventh Embodiment)

$L^*a^*b^*$ conversion is utilized to separate the image data into the lightness signal and the chromaticity signal in the tenth embodiment. However, a conversion scheme is not limited to this. For example, image data may be converted into Y, I, and Q signals used in a color television system. That is, the XYZ→$L^*a^*b^*$ conversion unit in FIG. 14 is replaced with an XYZ→YIQ conversion unit to perform conversion in the same arrangement as in the tenth embodiment. In this case, XYZ→YIQ conversion can be performed by the following equations:

① CIE XYZ→NTSC RGB $$R=1.9106X-0.5326Y-0.2883Z$$

$$G=-0.9843X+1.9984Y-0.0283Z$$

$$B=0.0584X-0.1185Y+0.8985Z$$

② NTSC RGB→YIQ $$Y=0.30R+0.59G+0.11B$$

$$I=0.60R-0.28G-0.32B$$

$Q = 0.21R - 0.52G + 0.31B$

However, the color components are not limited to the Y, I, and Q components, but can be replaced with L*, u*, and v* components.

(Twelfth Embodiment)

FIG. 8 is a block diagram showing an arrangement of the twelfth embodiment. The tenth embodiment exemplifies a color facsimile machine for performing image transmission. However, this embodiment exemplifies a copying machine which does not perform image transmission to an external device. In particular, the copying machine performs monochrome/color original judgement by prescanning. In main scanning, four-color (Y, M, C, and K) or three-color (Y, M, C) print processing is performed for a color image, and print processing in only black is performed for a monochrome image. Therefore, the processing speed for a monochrome image can be increased, and color misregistration can be prevented.

<Principle 4>

An original is read by a color scanner, and the read data are converted into R, G, and G data of the NTSC system. The R, G, and B data are converted into lightness data Y and chromaticity data I and Q. The data I and Q are plotted as shown in FIGS. 24 and 25.

Figure 24:
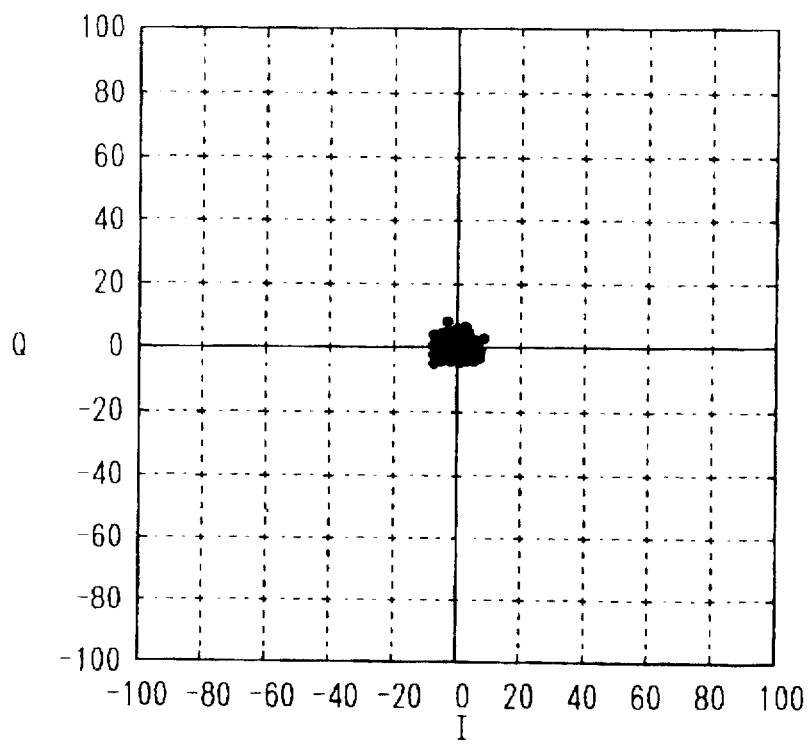
FIG. 24 is a graph showing an I-Q distribution obtained when a monochrome original is read.
Figure 25:
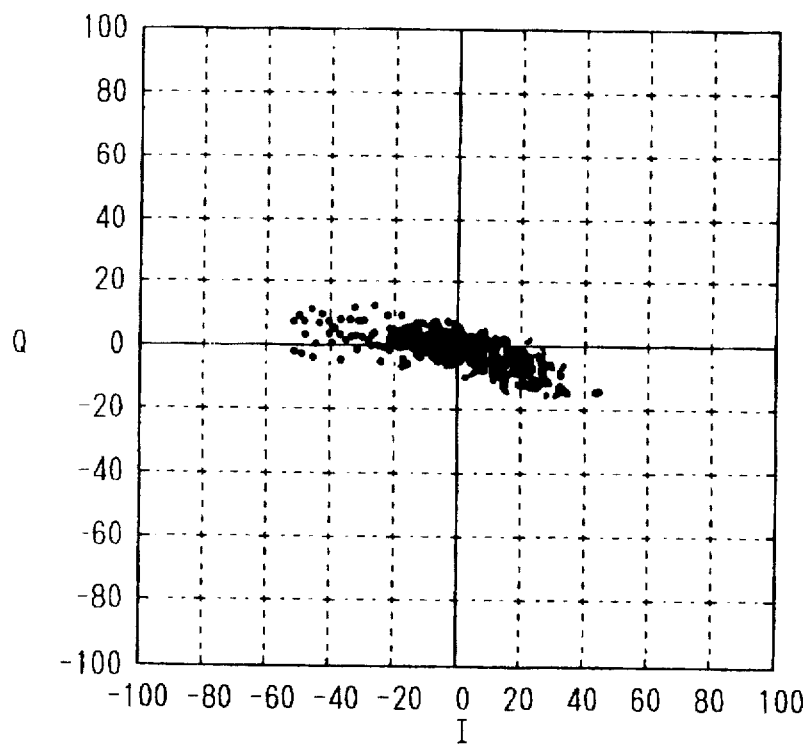
FIG. 25 is a graph showing an I-Q distribution obtained when a color original is read.

FIG. 24 shows the data I and Q of a monochrome original, and FIG. 25 shows the data I and Q of a color original. When the monochrome original is read, the data I and Q are distributed near the origin. However, in the color original, the data I and Q are plotted away from the original. When the number of pixels away from the origin is large, this input original is judged as a color original. Otherwise, the input original is judged as a monochrome original. Originals are judged on the basis of this principle.

(Read Precision of Scanner)

Figure 26:
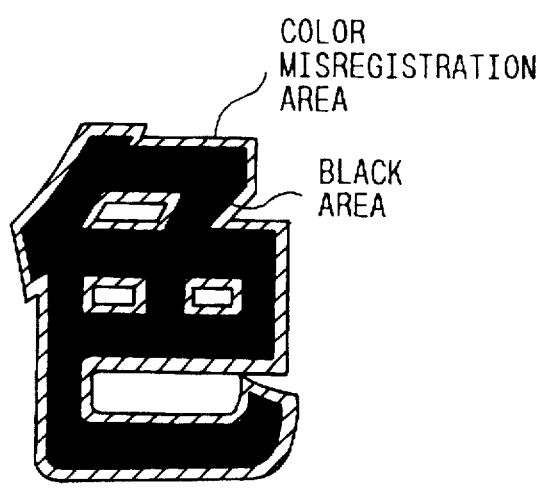
FIG. 26 is a view showing a color misregistration state.
Figure 30A:
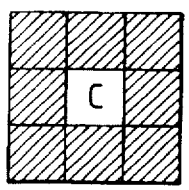
FIGS. 30A and 30B are views for explaining neighboring reference pixels.
Figure 30B:
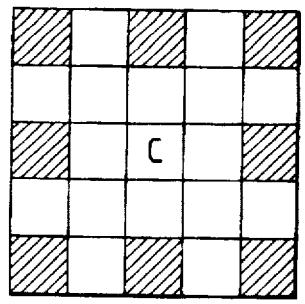
Figure 31A:
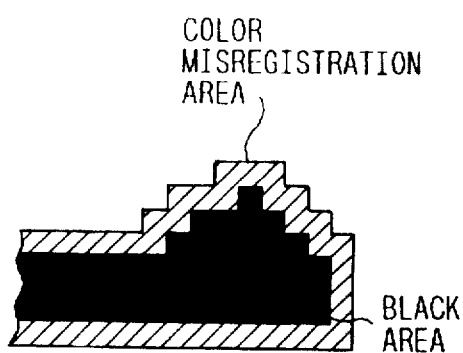
FIGS. 31A and 31B are views showing degrees of color misregistration caused by read magnifications.
Figure 31B:
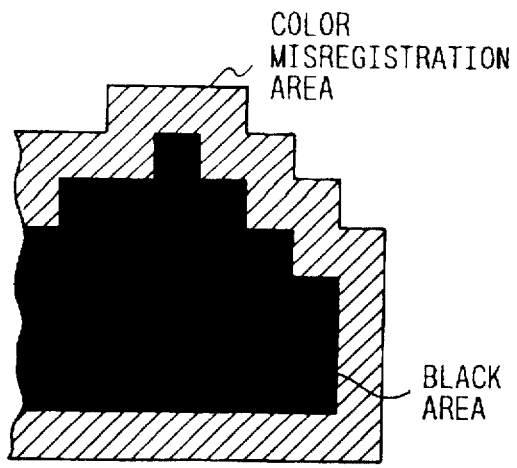

When a monochrome character is read by a scanner, and the scanner has poor read precision, the resultant input image has color misregistration, as shown in FIG. 26. A color misregistration pixel is judged as a color pixel, and an original is misjudged as a color original although this original is a monochrome original. For this reason, if a black pixel (a monochrome and dark pixel) is present around an input pixel, the input pixel is a color misregistration pixel. Therefore, this input pixel is judged as an actual monochrome pixel. With this operation, a read error of the scanner can be reduced. When an original is to be read in an enlargement mode, a color misregistration area is increased as shown in FIG. 31B as compared with a real size mode in FIG. 31A, and a black pixel away from the pixel of interest must be found. As shown in FIG. 30, in the real size mode, as shown in FIG. 31A, eight pixels (pixels of the hatched area) around the pixel of interest C are used to judge whether a black pixel is present. In an enlargement mode, as shown in FIG. 30B, eight pixels of the hatched area around the pixel of interest are used to judge whether a black pixel is present. In this manner, reference pixels around the pixel of interest are changed in accordance with the magnification coefficients, thereby performing accurate judgement.

(Original Judgement Precision)

Figure 29A:
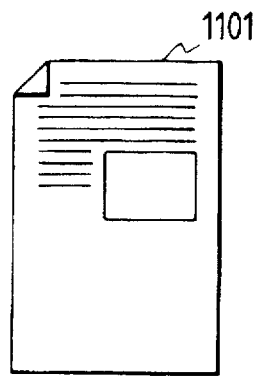
FIGS. 29A and 29B are views for explaining an operation for dividing an original into small areas.
Figure 29B:
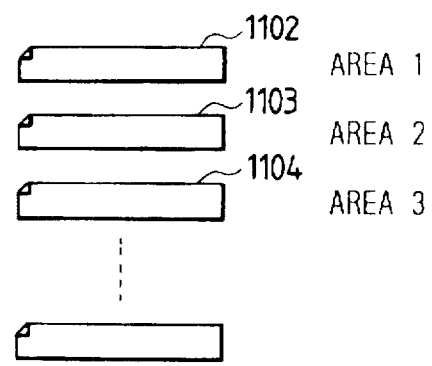

When a monochrome original having a red underline is to be judged, since the number of red pixels to that of all pixels of the original is large, a 50-mm line becomes similar to a 0.5-mm line. Judgement errors may occur due to different threshold values. More specifically, an original having a 50-mm red underline is judged as a monochrome original, or an original having dust having a diameter of about 0.5 mm is judged as a color original. In order to maximize a ratio of the number of color pixels (red underline) to that of all pixels of the original, a technique in FIGS. 29A and 29B is used. More specifically, an original 1101 shown in FIG. 29A is divided into a plurality of small areas, and the original is judged in units of small areas. Assume that area 1 of 1102 and area 2 of 1103 are judged as monochrome original areas, and that area 3 of 1104 is judged as a color original area. The original 1101 is judged as a color original. Unless any small area is judged as a color original area, the original 1101 is judged as a monochrome original.

Figure 32A:
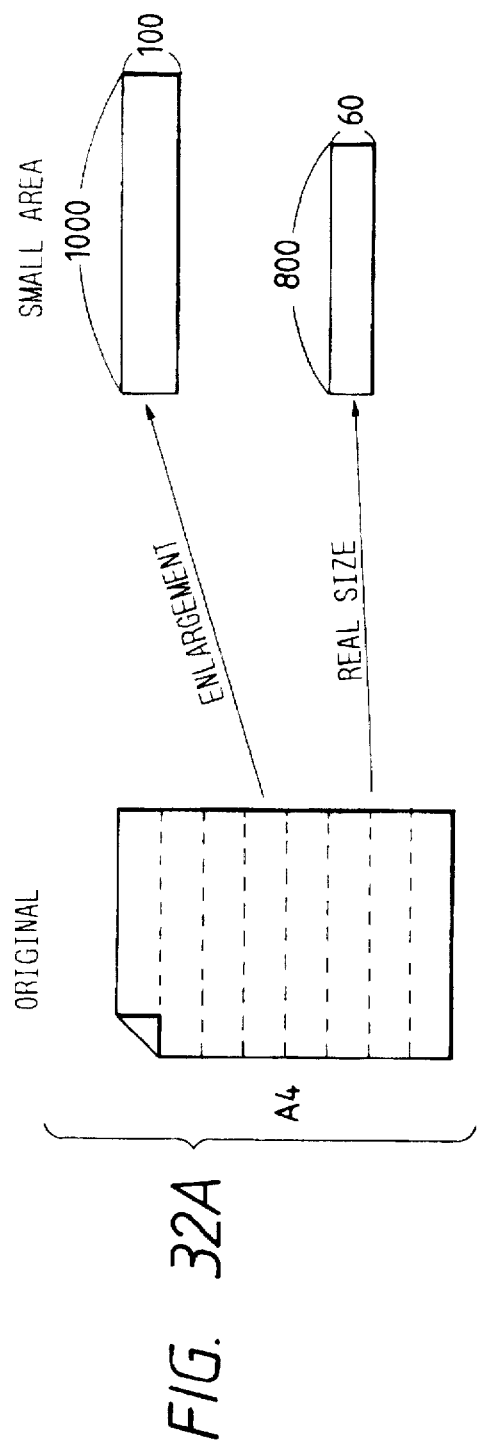
FIGS. 32A and 32B are views showing changes in size of a small area in accordance with an original size and an enlargement reduction magnification.
Figure 32B:
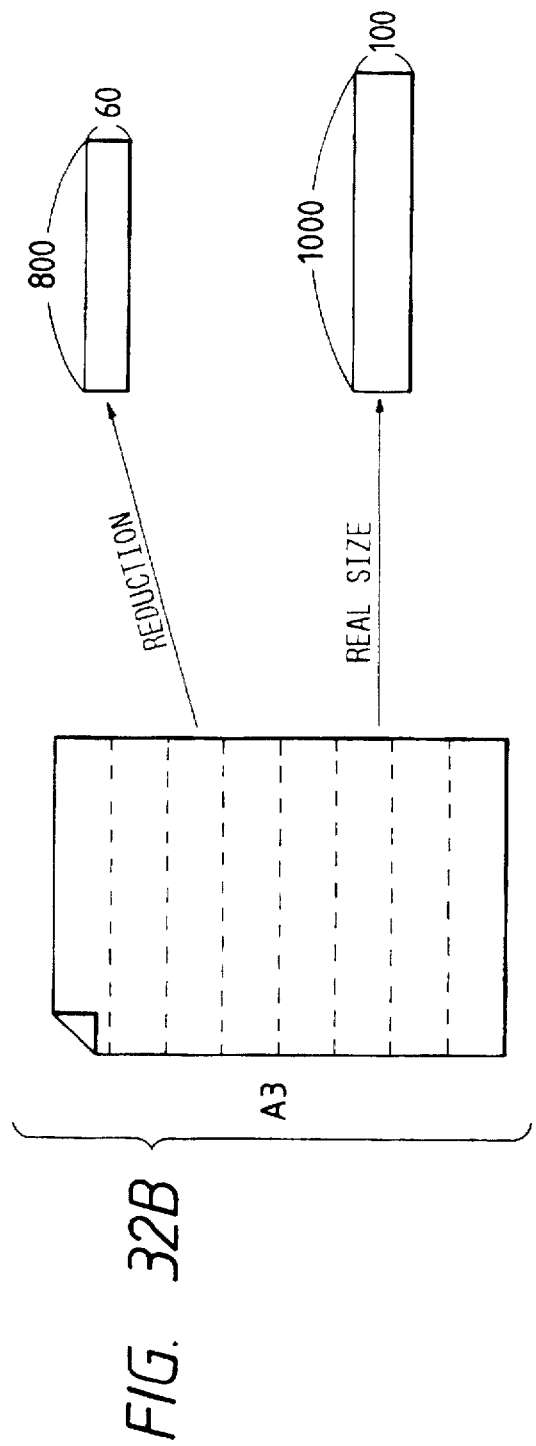

Judgement of a small area as a color or monochrome original area is performed by counting color pixels in each small area and comparing the number of color pixels with a color pixel threshold value δ. If one of the eight areas of an original is assumed as a small area, as shown in FIG. 32, the size of the small area is changed in accordance with a change in original size or enlargement or reduction magnification. For this reason, a color pixel threshold value δ is set on the basis of a small area size upon its calculation. For example, a color pixel area is judged by 0.1% or more of the number of all pixels of the small area, and a monochrome original area is set by less than 0.1% of the number of all pixels of the small area. In the real size mode in FIG. 32A, since the number of all pixels of the small area is 4,800, 48 pixels as 0.1% of the total pixel count is defined as the color pixel threshold value δ. In the enlargement mode, since the total number of pixels of the small area is 100,000, 100 is the color pixel threshold value δ. In this manner, the color pixel threshold value δ is changed in accordance with a change in original size and enlargement/reduction magnification.

(Thirteenth Embodiment)

A flow chart of this processing is shown in FIG. 27. The processing is divided into parameter setting processing (S517 and S518), pixel judgement processing (S501 to S504), pixel correction processing (S505 to S511), and original judgement processing (S512 to S516). The pixel judgement processing is processing for judging whether a pixel of interest is a color or monochrome pixel. The original judgement processing is processing for judging whether the original as a whole is a color or monochrome original. The details of the algorithm will be described with reference to the flow chart below.

<Parameter Setting Processing>

An original size and a copying magnification are designated at the operation unit (S517). A CPU sets a judgement parameter in a manner to be described later (S518).

<Pixel Judgement Processing>

Color pixel judgement processing will be described first. Color pixel judgement is performed in steps S501 to S504 to judge whether an input pixel is a color or monochrome pixel in units of pixels.

① Color Space Conversion Processing

Color Space conversion processing is performed in step S501. More specifically, the data normalized into NTSC-RGB are converted into a luminance signal Y and chrominance signals I and Q in accordance with equations (1) below:

$$\begin{cases} Y = 0.30R + 0.59G + 0.11B \\ I = 0.60R - 0.28G - 0.32B \\ Q = 0.21R - 0.52G + 0.31B \end{cases} \quad (1)$$

② Distance Calculation

In order to generate saturation information from the I and Q data, a distance calculation unit calculates $\sqrt{I^2 + Q^2}$ in steps S502 and S506. This distance represents a distance between the origin and the target color on the IQ diagram. When this value is large, the saturation value is large accordingly. The corresponding pixel has a higher probability as a color pixel.

③ Saturation Comparison Unit

The saturation value of the pixel of interest is compared with the threshold value in step S503. As shown in FIG. 28A, the pixel C of interest is part of a character or an under color portion (limited to white), it has a low saturation level. The flow advances to step S504 to satisfy condition $\sqrt{I^2+Q^2}<\alpha$, and a black pixel count BPLX is incremented by one. The flow returns to step S502, and the next pixel is read to repeat the above processing.

When the pixel of interest is assumed to be located as a color pixel, as shown in FIG. 28B, it has a high saturation level, and the flow advances to step S505 without satisfying condition $\sqrt{I^2+Q^2}<\alpha$.

③ Pixel Correction Processing

Steps S505 to S511 correspond to the pixel correction processing unit. These steps are provided to correct a judgement error as a color pixel due to blurring of a black character caused by color misregistration of the sensor even if the saturation comparison unit corresponding to step S503 judges that the input pixel is a color pixel. The pixel correction unit will be described below.

In step S505, eight neighboring pixels $S_1$ to $S_8$ of the pixel C of interest in FIG. 5 are input one by one. In step S506, RGB→YIQ conversion is performed by color space conversion (the same as in steps S501).

Saturation information $\sqrt{I^2+Q^2}$ is calculated in step S507 (the same as in steps S502). Saturation values $\sqrt{I^2+Q^2}$ of the neighboring pixels and the luminance Y are compared with the threshold values in step S508. For example, when the neighboring pixel $S_1$ is a character portion, the saturation and luminance values of this pixel are low, it satisfies conditions $\sqrt{I^2+Q^2}<\beta$ and $Y<\gamma$. As a result, although the pixel C is judged as a color pixel in pixel judgement processing, this misjudgement is caused by color misregistration of the sensor. This pixel must be judged as a black pixel, and the flow advances to step S509. The black pixel count BPLX is incremented by one. Since the neighboring pixel $S_6$ does not satisfy conditions $\sqrt{I^2+Q^2}<\beta$ and $Y<\gamma$, the pixel $S_6$ is determined not to be a black pixel. In this case, the flow advances to step S510. It is judged in step S510 whether all the eight neighboring pixels are input. Processing in steps S505 to S510 to judge whether a black pixel is included in the eight neighboring pixels is repeated for all the eight pixels in S501 to S508 of the pixel of interest. If at least one black pixel is included in the eight neighboring pixels, the pixel C of interest is judged as a black pixel, and the flow advances to step S509. If no black pixel is included in the eight neighboring pixels, the pixel C of interest is not judged as a color pixel by color misregistration, but is a real color pixel. In this case, the flow advances to step S511, and the color pixel count CPLX is incremented by one.

<Color/Monochrome Original Judgement>

The pixel judgement (S501 to S511) described above is performed for all the pixels of the original to calculate a ratio of the color pixel count CPLX to the monochrome pixel count BPLX. When condition CPLX>δ is satisfied in step S513, the target original is judged as a color original. Otherwise, the target original is judged as a monochrome original. This area judgement is performed for all small areas of the original. If at least one small area which is judged as a color area, the original as a whole is judged as a color original; otherwise, the original is judged as a monochrome original (S516).

The above flow chart shows processing executed by computer software. A circuit arrangement for performing the above processing will be described.

Figure 19:
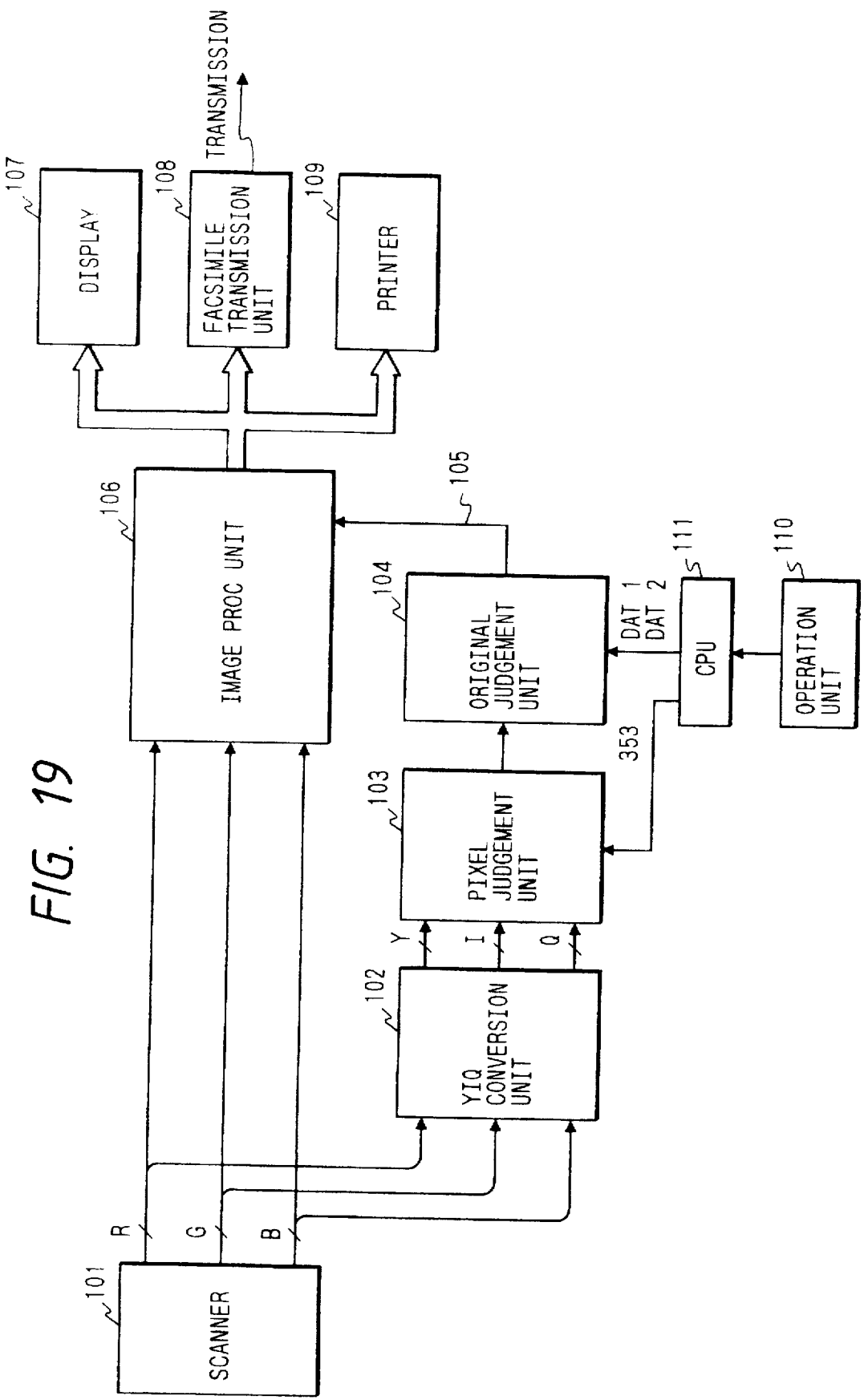
FIG. 19 is a block diagram showing an automatic color/monochrome original judgement apparatus according to the thirteenth embodiment of the present invention.

Referring to FIG. 19, when an original is placed on a scanner 101 consisting of a CCD device and scanned, normalized R, G, and B data complying with the NTSC system are output. R, G, and B data output from the scanner 101 are converted by a YIQ conversion unit 102 into a lightness (luminance) signal Y and (chromaticity) chrominance signals I and Q. A pixel judgement unit 103 judges whether an input pixel is a monochrome (small saturation value) or color pixel. An original judgement unit 104 accumulates the judgement results in units of pixels and calculates a ratio of the number of color pixels to the total number of pixels. The original judgement unit 104 outputs an original judgement signal 105 representing that the original is a color or monochrome original in accordance with the calculated ratio. This circuit arrangement also includes an image processing unit 106 for outputting an image reproduction signal having a magnification input from an operation unit 110, a display 107 for performing an image display, a facsimile transmission unit 108 for performing image transmission, and a printer 109 for reproducing an image on a recording medium. The operation unit 110 is used to manually designate an original size and a copying magnification. A CPU 111 judges a pixel in accordance with the original size and the copying magnification designated at the operation unit 110, determines an original judgement parameter, and outputs a parameter signal 353, DAT1, and DAT2.

The image processing unit 106 performs different processing operations for the monochrome and color originals in accordance with the original judgement signal 105.

For example, an image signal sent to the facsimile transmission unit 108 is subjected to compression coding so as to store it in the form of R, G, and B signals for a color original, and is subjected to density (luminance) signal conversion to perform compression coding such as MH, MR, or MMR coding for a monochrome original.

When an image signal of a color original is to be sent to the printer 109, predetermined processing operations such as logarithmic conversion, UCR, and masking are performed for the R, G, and B signals, thereby performing image processing to obtain frame sequential Y, M, C, and K signals and then performing monochrome processing. However, an image signal of a monochrome original is processed to obtain only a K (black) signal, thereby performing printing in only black.

The printer may be a color printer such as a laser beam printer, an ink-jet printer, a thermal printer, or a dot printer.

Figure 20:
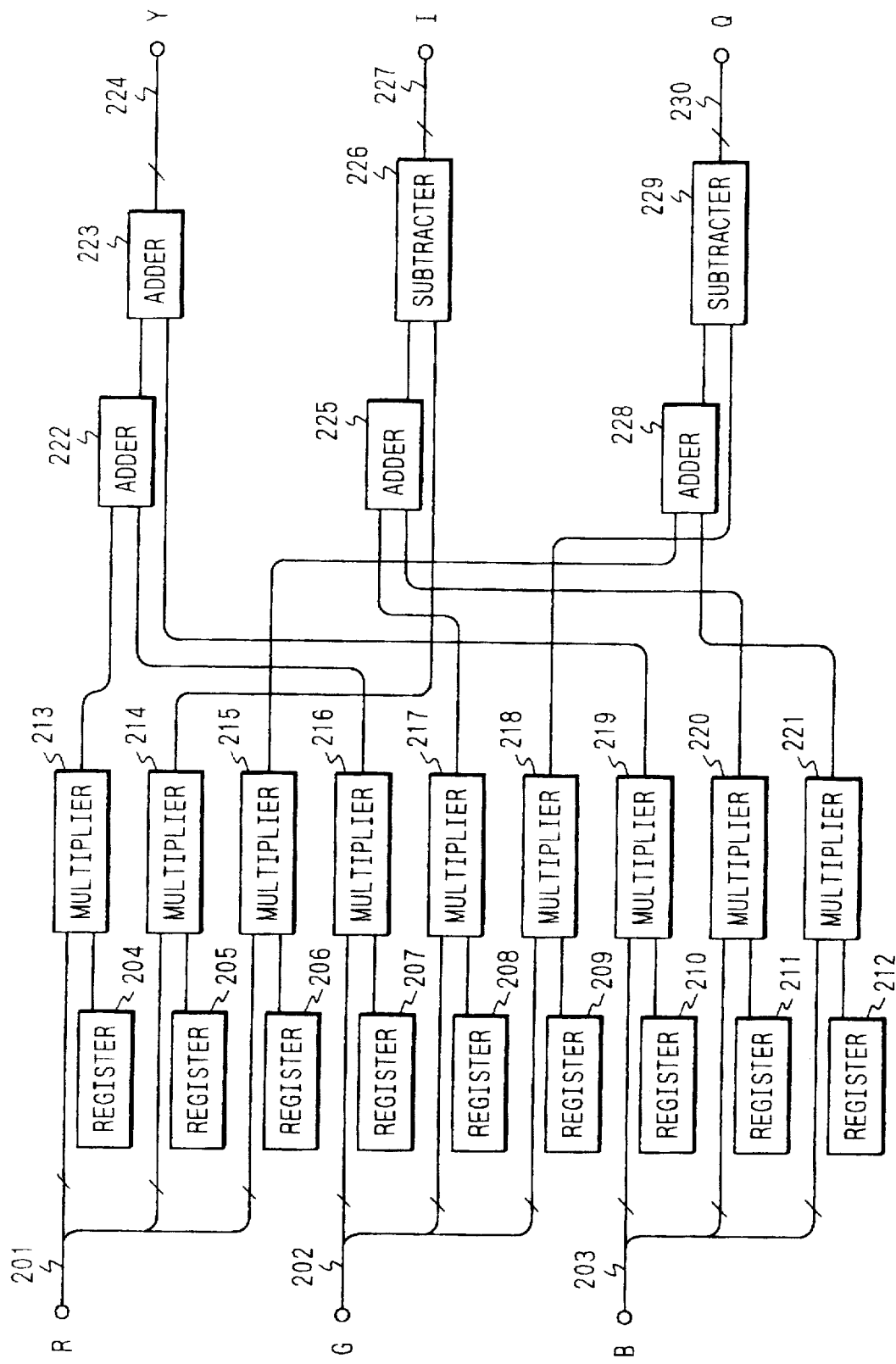
FIG. 20 is a block diagram showing a YIQ conversion unit.

FIG. 20 is a block diagram showing the YIQ conversion unit for calculating values of equations (1). The YIQ conversion unit receives R, G, and B input signals 201, 202, and 203. The YIQ conversion unit also includes registers 204 to 212 for storing coefficients of equations (1), multipliers 213 to 221 for multiplying the coefficients of equations (1) with the coefficients, adders 222, 223, 225, and 228, and subtracters 226 and 229. Operation results of Y, I, and Q are output to 224, 227, and 230, respectively.

For example, in order to calculate Y, 0.3, 0.59, and 0.11 are respectively set in the registers 204, 207, and 210. The R data 201 and the content of the register 204 are multiplied by the multiplier 213. Similarly, the G data and the content of the register 207 are multiplied by the multiplier 216, and the B data and the content of the register 210 are multiplied by the multiplier 219. Three products are added by the adders 222 and 223 to finally obtain data Y. Data I and Q can also be obtained in the same manner as described above.

Figure 21:
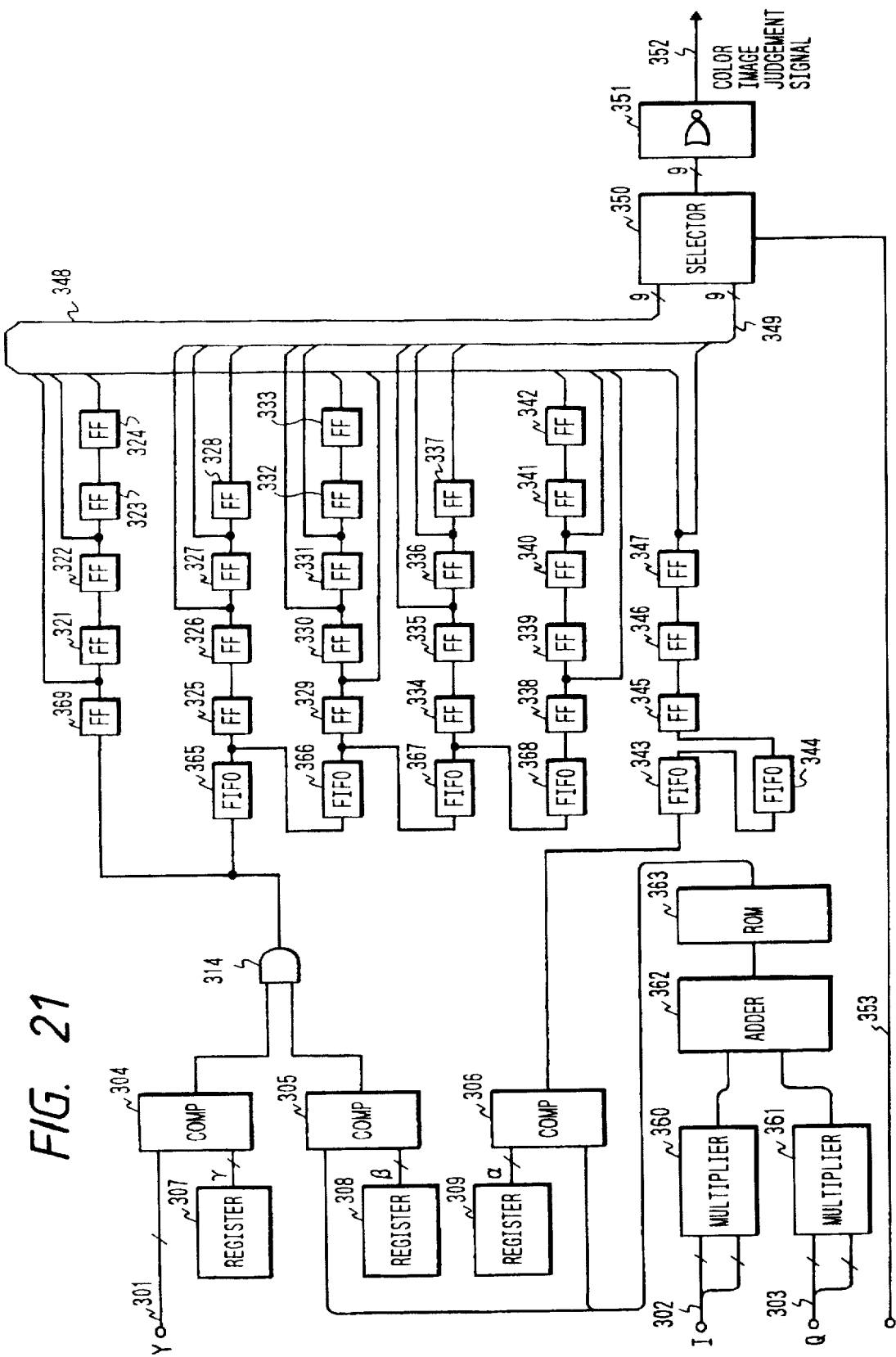
FIG. 21 is a block diagram showing a pixel judgement unit.

FIG. 21 is a view showing the pixel judgement unit. Y, I, and Q data are input to input terminals 301, 302, and 303, respectively. The data I is squared by a multiplier 360, and the data Q is also squared by a multiplier 361. The products $I^2$ and $Q^2$ from the multipliers 360 and 361 are added by an adder 362. A calculation of $\sqrt{I^2+Q^2}$ is performed with reference to a table. For example, an input to a ROM 363 is "2", the second address of the ROM is accessed, and the corresponding data "1.1414" is output. The output value $\sqrt{I^2+Q^2}$ from the ROM 363 is input to comparators 305 and 306. A threshold value β is set in a register 308, and the threshold value α is set in a register 309. The comparator 305 compares the threshold value β with $\sqrt{I^2+Q^2}$ and outputs "1" data if condition $\beta<\sqrt{I^2+Q^2}$. Otherwise, the comparator 305 outputs "0" data. An output result of the comparators 306 is called a primary judgement result.

As for the lightness (luminance) signal, a threshold value γ is set in a register 307, and a comparator 304 compares Y with γ. If Y<γ, then the comparator 304 outputs "1" data. Otherwise, the comparator 304 outputs "0" data. Outputs from the comparators 304 and 305 are logically ANDed by an AND gate 364. More specifically, when a lightness (luminance) is low, and saturation is also low, the AND gate 364 outputs "1" data. Otherwise, the AND gate 364 outputs "0" data. An output result of the AND gate 364 is called a secondary judgement result. The output from the AND gate 364 is input to a flip-flop (to be referred to as an FF hereinafter) 369 and a line memory 365.

An output from the line memory 365 is input to a line memory 366 and an FF 325. A pixel delayed by one line is input to the FF 325 and a pixel delayed by two lines is input to an FF 329. Similarly, pixels are supplied to line memories 367 and 368, so that a pixel delayed by three lines is stored in an FF 334 and a pixel delayed by four lines is stored in an FF 338. In this manner, the FFs 320 to 342 store output results from the AND gate 364 in synchronism with pixel clocks. At a given moment, when the secondary judgement result of the pixel of interest is stored in the FF 331, the secondary judgement results of the 22 neighboring pixels are stored in the FFs 320 to 342 (except for the FF 331). An output (primary judgement result) from the comparator 306 is input to a line memory 343, and an output from the line memory 343 is input to a line memory 344. An output from the line memory 344 is input to FFs 345, 346, and 347. The FFs 311 and 347 store the primary and secondary judgement results of the same pixel, respectively. A total of nine signals as the primary judgement results of the neighboring pixels indicated by the hatched pixels in FIG. 29B and the primary judgement result of the pixel of interest are supplied onto a signal line 348. A total of nine signals as the secondary judgement results of the hatched pixels in FIG. 29A and the primary judgement result of the pixel of interest are supplied onto a signal line 349. A selector 350 selects one of these signal lines in response to a selection signal SEL (353). The selection signal 353 output from the CPU 111 in response to a magnification designated at the operation unit 110 selects the signal line 349 when the read magnification is small, and correction is performed using a matrix shown in FIG. 30A. However, when the magnification is large, the signal line 348 is selected, and correction using a matrix in FIG. 30B is performed. An output from the selector 350 is input to a NOR gate 351. The NOR gate 351 has nine inputs and one output. When any one of the primary and secondary judgement results is set to be "1", the input pixel is judged as a color pixel, so that a color pixel judgement signal 352 is output as a "1" signal. That is, when the pixel of interest is judged as a color pixel, the color pixel judgement signal 352 is set at logic "1". Otherwise, the pixel of interest is judged as a monochrome pixel, and the signal 352 is set at logic "0".

A plurality of parameters can be set in the registers 307, 308, and 309, and judgement parameters γ, β, and α can be selectively used. More specifically, when a magnification is large, a possibility of color misregistration is high. Larger parameters $\gamma_2$, $\beta_2$, and $\alpha_2$ than parameters $\gamma_1$, $\beta_1$, and $\alpha_1$ ($\gamma_2>\gamma_1$, $\beta_2>\beta_1$, $\alpha_2>\alpha_1$) are selected.

Figure 22:
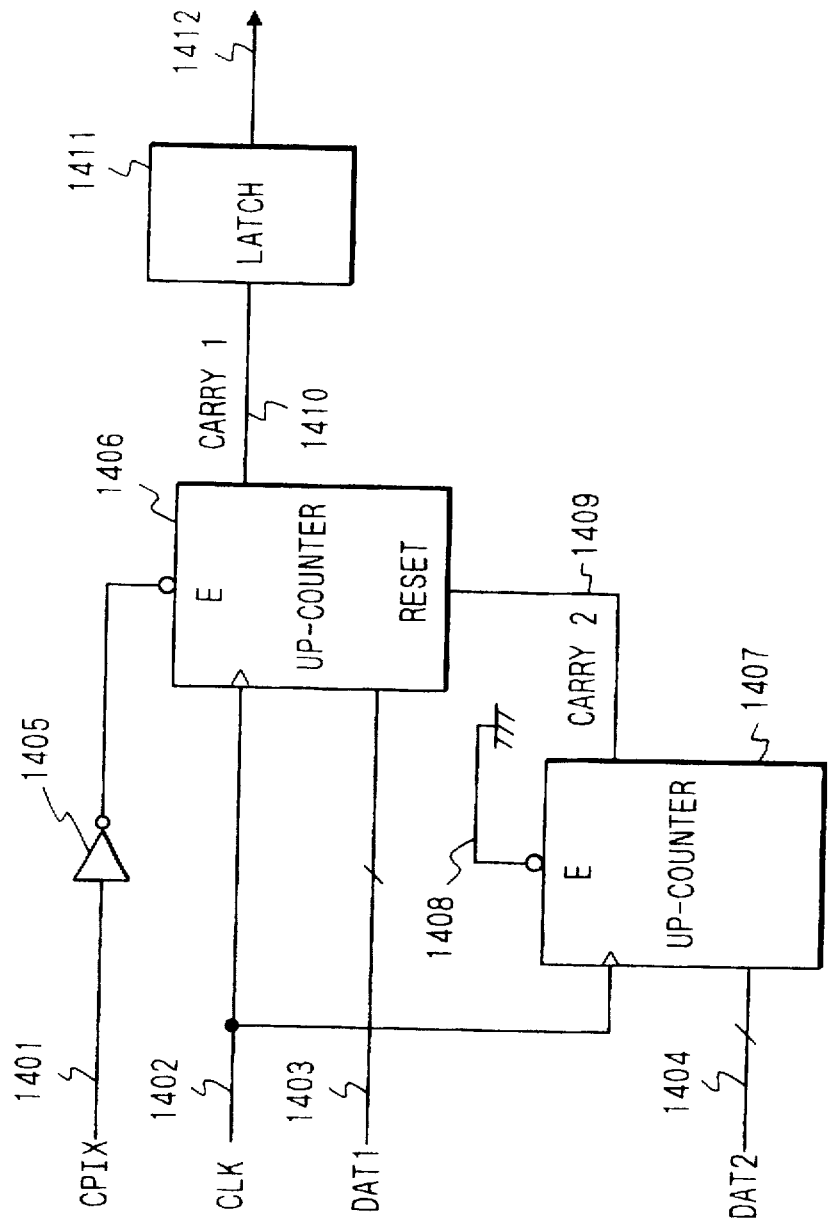
FIG. 22 is a block diagram showing an original judgement unit.

FIG. 22 is a block diagram of an original judgement unit. Since a count enable terminal 1408 of an up-counter 1407 is set at "0" (enabled), the up-counter 1407 counts up initial count data DAT2 (1404) in synchronism with a pixel clock 1402. When a carry CARRY2 (1409) is set at "1", the up-counter 1407 is reset and restarts counting from the initial count data. The up-counter 1407 counts pixels of the small area of the original. For example, when the number of pixels of the small area 1102 is 1,000, the up-counter 1407 counts 1,000 pixels. When 1,000 pixels are counted, the carry 1409 is set at "1", and an up-counter 1406 is reset. The initial count data is set such that, if the up-counter 1407 is a 10-bit counter, when the initial count data 24 is set in the DAT2, 1,000 pixel clock pulses 1402 are counted to set the carry CARRY2 (1409) to "1".

The up-counter 1406 receives the initial count data DAT1 at its input 1403, a pixel clock at its input 1402, and a color pixel judgement signal at its input 1401, and outputs a carry bit 1410. The counter 1406 performs count-up operation from the initial count data. During a count-up enable period, the color pixel judgement signal is counted during the "1" period of the color pixel judgement signal. As a result, the color pixel judgement signals are counted. For example, if the counter 1406 is a 10-bit counter and the original judgement threshold value (color pixel threshold value) δ is 255, 769 is set in the DAT. When the number of pixels judged as color pixels becomes 255, the carry bit 1407 is set to be "1". When the number of color pixels in the original becomes 255 or more, a signal (original judgement signal 105) representing that the target original is a color original becomes "1". The original judgement value (color pixel threshold value) δ is calculated in the CPU 106 on the basis of the original size and the enlargement/reduction magnification and is set in the counter 1406.

When the read magnification is large, or when the original size is large and the magnification is small, or when the original size is small, a threshold value $\delta_2$ larger than the threshold value $\delta_1$ is used. The threshold value set in the DAT1 is changed in accordance with the original size and the copying magnification designated at the operation unit 110, thereby performing appropriate judgement. The value δ can be continuously or discretely changed in accordance with the magnification.

The number of pixels of the small area set in the DAT2 can be changed in accordance with the original size and the magnification.

The judgement of each small area of the original is output as the carry CARRY1 (1410) and is latched by a latch circuit 1411. When judgement of all the small areas of the original is completed, the judgement result is output from an output terminal 1412.

The original is judged as a color or monochrome original by the above processing.

(Fourteenth Embodiment)

Figure 23:
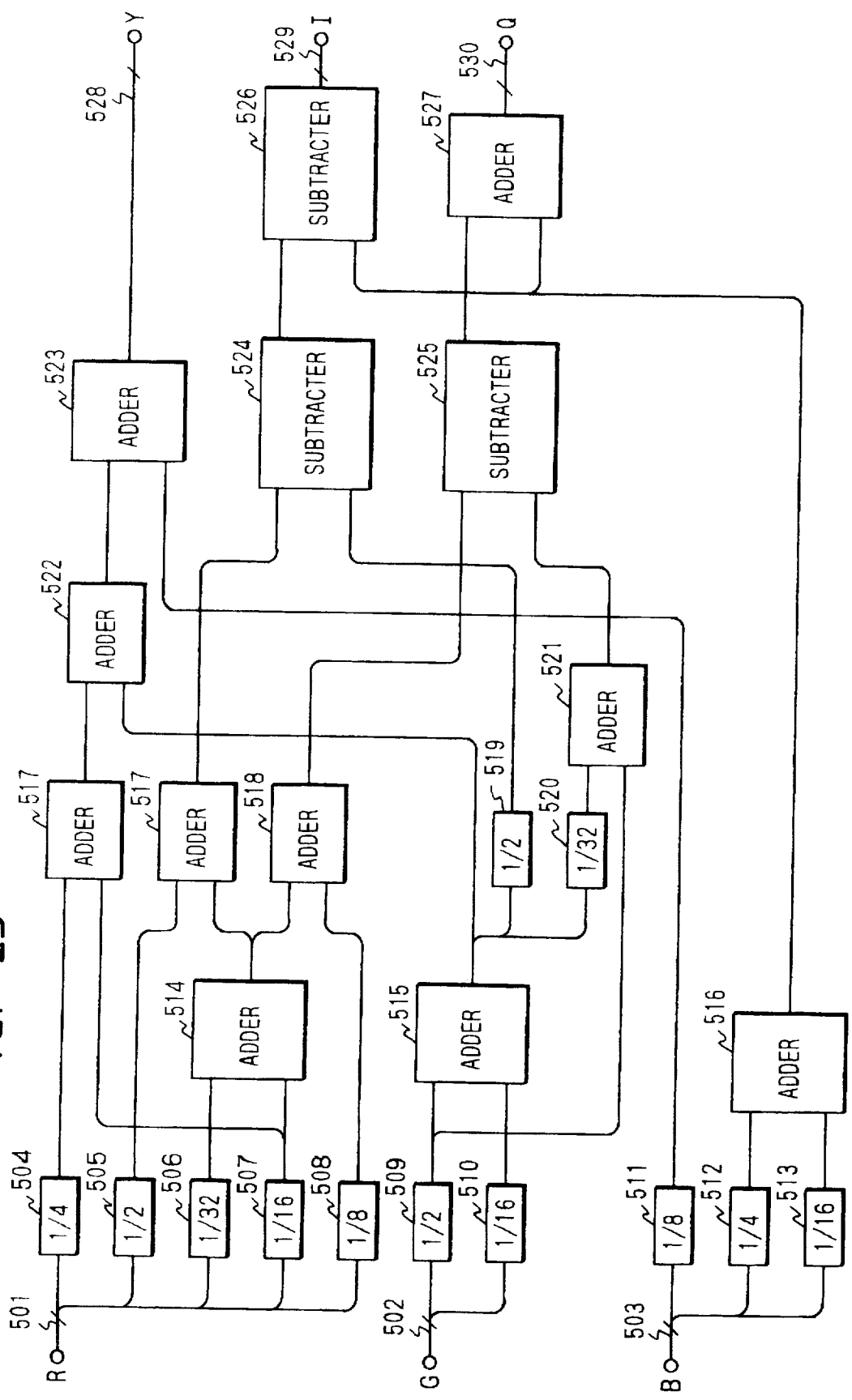
FIG. 23 is a block diagram showing a YIQ conversion unit according to the second embodiment.

FIG. 23 is a block diagram for explaining the fourteenth embodiment. The arrangement of FIG. 20 is used to realize the calculations of equations (1) in the thirteenth embodiment. However, in the fourteenth embodiment, an arrangement of FIG. 23 is used to approximate the calculations of equations (1). When the coefficients of equations (1) are approximated by adding 1/(power of 2) to each coefficient of equations (1) to obtain equations (2). For example, the coefficient of 0.3 in equations (1) is approximated as 0.25+ 0.0625. By adding data obtained by shifting the input data by two bits and data obtained by shifting the input data by four bits to easily calculate 0.3*R as follows:

$$\begin{cases} Y = \left(\dfrac{1}{4} + \dfrac{1}{16}\right)R + \left(\dfrac{1}{2} + \dfrac{1}{16}\right)G + \dfrac{1}{8}B \\[4pt] I = \left(\dfrac{1}{2} + \dfrac{1}{16} + \dfrac{1}{32}\right)R - \left(\dfrac{1}{4} + \dfrac{1}{32}\right)G - \\[4pt] \qquad \left(\dfrac{1}{4} + \dfrac{1}{16}\right)B \\[4pt] Q = \left(\dfrac{1}{8} + \dfrac{1}{16} + \dfrac{1}{32}\right)R - \left(\dfrac{1}{2} + \dfrac{1}{64} + \dfrac{1}{128}\right)G + \\[4pt] \qquad \left(\dfrac{1}{4} + \dfrac{1}{16}\right)B \end{cases} \quad (2)$$

FIG. 23 will be described below in detail. R, G, and B input data are input to input terminals 501, 502, and 503, respectively. Bit shift units 504 to 513, 519, and 520 are circuits for shifting bits of the input data. This circuit arrangement also includes adders 514, 515, 516, 517, 518, 521, 523, and 527, and subtracters 524, 525, and 526. The finally calculated data, i.e., data Y, I, and Q appear at output terminals 528, 529, and 530, respectively.

A data flow will be described below. The Y, I, and Q data are similarly calculated, the calculation of the Y data is exemplified, and those of the data I and Q are omitted. As calculations of the (¼+1/16) term of the equation (2), a 2-bit shift operation is performed by the ¼ circuit 504, and a 4-bit shift operation is performed by the 1/16 circuit 507. The calculation results are added by the adder 517. As calculations of the (½+1/16) term, the input G data is shifted by the ½ circuit 509 by one bit, and a 4-bit shift operation is performed by the 1/16 circuit 510. The result and the output from the adder 517 are added by the adder 522. An output from the adder 522 is a sum of the R and G terms in the Y calculations of the equation (2). Data obtained by shifting the B input data 503 by three bits is input to the adder 523. Finally, an output 528 from the adder 523 is given as Y in equation (2).

In the embodiment described above, since there are provided: a means for separating component signals of the input color signal into lightness and chromaticity signals; a means for generating a saturation signal from the chromaticity signal; a means for comparing the saturation signal with a threshold value α; a means for comparing the saturation signal with a threshold value β; a means for comparing the lightness signal with a threshold value γ; a means for incrementing a monochrome pixel count by one if the saturation signal is smaller than α as a result of comparison between a pixel of interest and the threshold value; a means for incrementing the monochrome pixel count by one when a pixel satisfying given conditions is included in neighboring pixels, and for incrementing a color pixel count by one when such a pixel is not included in the neighboring pixels, the given conditions being such that the saturation signal is smaller than β as a result of comparison between the saturation signal and β and that the lightness signal is smaller than γ as a result of comparison between the lightness signal and γ, the neighboring pixels being determined when the saturation signal is equal to or larger than α as a result of comparison between the saturation signal of the pixel of interest and the threshold value; a means for selecting the neighboring pixels in accordance with a read magnification; a means for performing pixel judgement of unit lines of pixels and judging an original region of the unit pixels as a color original region when the color pixel count is larger than the value δ as a result of comparison between the color pixel count and the threshold value δ; a means for performing judgement of all areas of the original in units of original areas; and a means for judging the original as a color original when a color original region is present in the original areas, an original can be accurately judged even if the scanner precision is poor or the original has light color paper. Accurate judgement can also be performed for an original having a colored underline. Accurate original judgement can be performed without causing color misregistration when the original is read in an enlargement/reduction mode. As a result, processing can be performed in accordance with types of originals. Print quality can be improved, and the communication cost can be reduced.

The image input means is not limited to the scanner, but can be replaced with an interface such as a host computer, a still video camera, and a video camera.

The number of neighboring pixels is not limited to 8, and OR processing may be replaced with majority decision processing.

The input image may be separated into (L*, a*, b*), (L*, u*, v*), (Y, u, v) or (Y, Cr, Cb) in place of (Y, I, Q).

[Adjustment of Original Judgement]

Primary judgement for judging whether an input pixel is a color or monochrome pixel is performed by comparing saturation data (i.e., a distance $\sqrt{I^2+Q^2}$ from the origin of the IQ diagram; or a method using |I|+|Q| may be used instead) of the input image with a pixel judgement threshold value α.

Figure 33B:
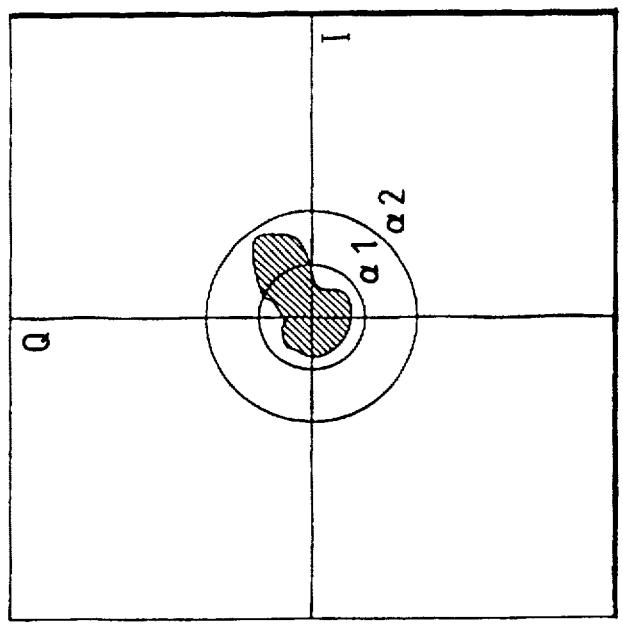
FIGS. 33A and 33B are views for explaining an operation for setting a pixel judgement threshold value α.
Figure 33A:
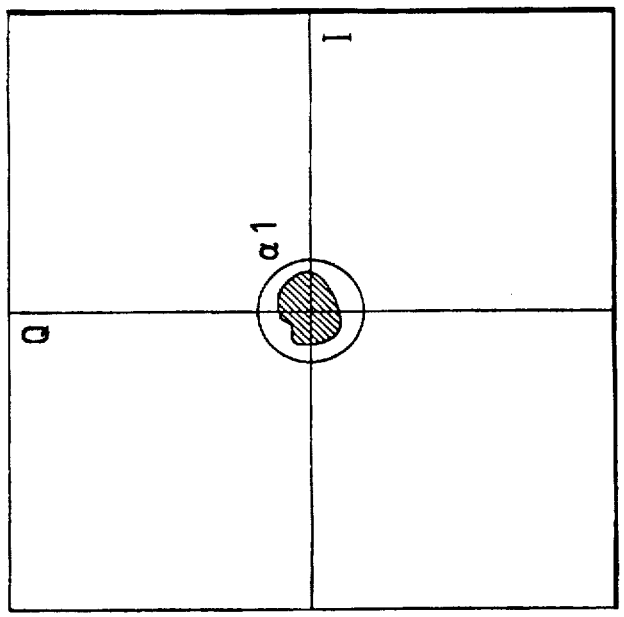

FIGS. 33A and 33B will be described below. FIG. 33A shows an distribution of I and Q data upon reading of a monochrome original. When a pixel judgement threshold value is set to be α1, the I and Q data are concentrated near the origin, so that the all the saturation values of the input image are smaller than α1, and no color pixel is present. FIG. 33B shows a distribution of I and Q data upon reading of a black character original with light red paper. When the pixel judgement threshold value is set to be α1, some pixels have saturation data larger than α1, the presence of color pixels is judged. When the pixel judgement threshold value is set to be α2, all the saturation values of the input pixel are smaller than α2, no color pixel is present. In this manner, the number of pixels judged as color pixels can be controlled by changing the pixel judgement threshold value. Therefore, a black character original with colored paper can be judged as a color or monochrome original. That is, the judgement result can be controlled by the user in accordance with the magnitude of the pixel judgement threshold value.

(Fifteenth Embodiment)

An original such as section paper having colored rules and an original having a red seal are apparently color originals. When a user wishes the system to transmit these originals as monochrome originals because they are frequently transmitted, data representing a color similar to the registered color is input, and the color pixel judgement signal is canceled.

Figure 37:
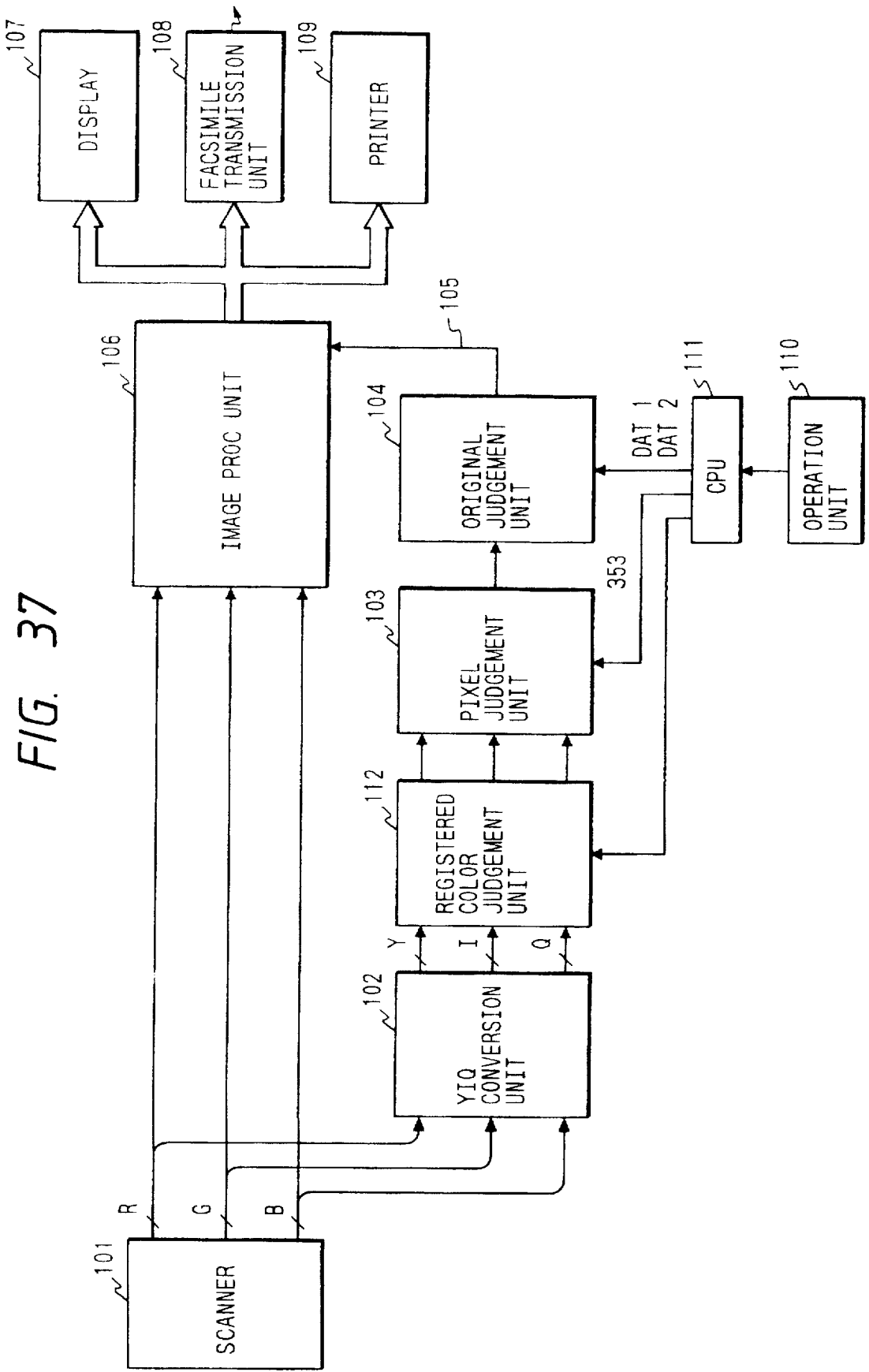
FIG. 37 is a block diagram showing an arrangement according to the fifteenth embodiment of the present invention.

FIG. 37 is a block diagram showing an arrangement of this embodiment. This arrangement is roughly the same as that shown in FIG. 19, except that a registered color judgement unit 112 is added.

(Registered Color Processing)

Although an original such as section paper having colored rules and an original having a red seal are apparently color originals, a user wishes the system to transmit these originals as monochrome originals because they are frequently transmitted. Colors which should not be judged as color pixels such as blue as the color of the section paper and red as the color of the red seal are registered beforehand. When data of this pixel is input, color pixels are not counted. In this case, the original is judged as a monochrome pixel, so that the user's need is satisfied.

Figure 34:
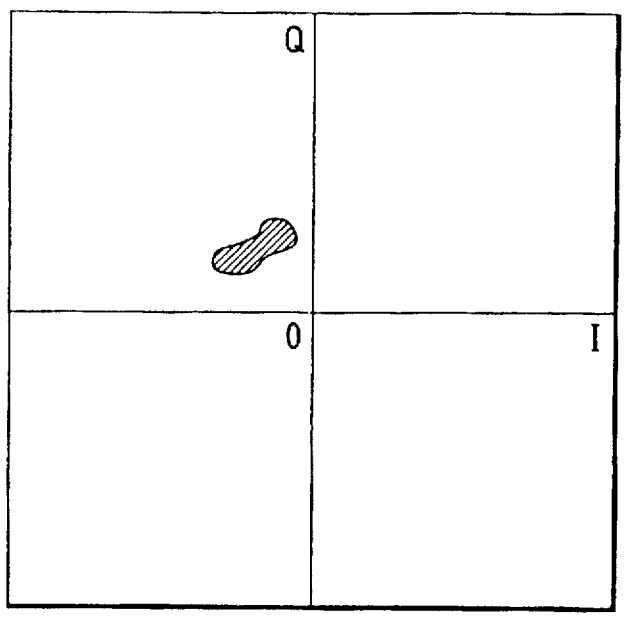
FIG. 34 is a view showing a blue distribution of section paper.
Figure 35:
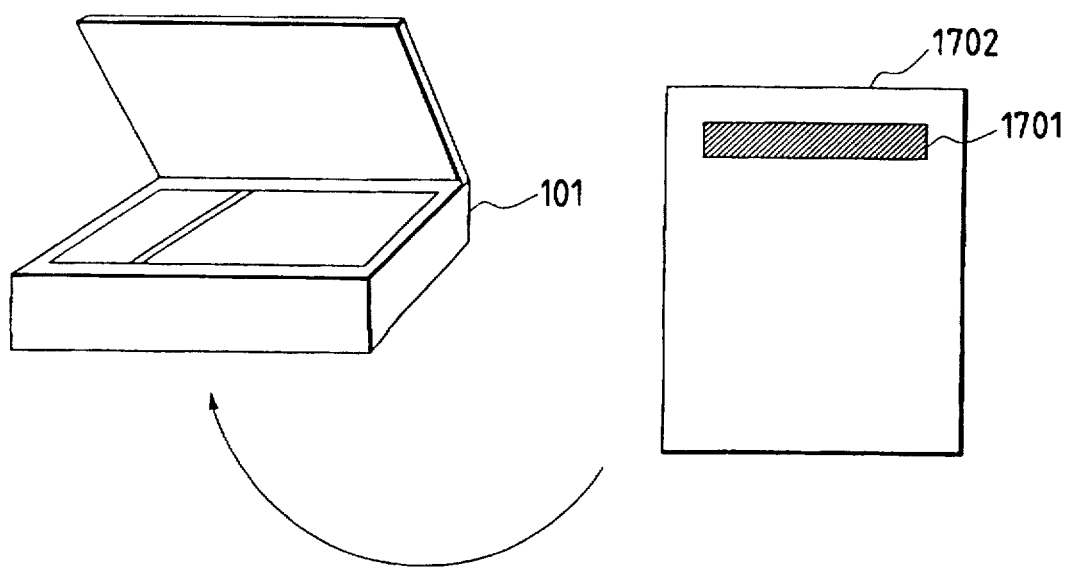
FIG. 35 is a view for explaining registration of colors.

More specifically, a color 1701 which should not be judged as a color pixel, as in FIG. 35, is painted on or adhered to a registration sheet and is read by a scanner 101. For example, blue of the section paper is a color to be registered, a blue portion is adhered to a registration sheet 1702 and is read by the scanner 101. The read data is converted into Y, I, and Q data which are then plotted on the IQ chromaticity diagram, as shown in FIG. 34. Representative Y, I, and Q data are given as registered color data (e.g., Y=50, I=−20, Q=25).

Upon this data registration, if input data is close to the registered data, the corresponding original is not judged as a color image but is judged as a monochrome image, thus performing registered color processing.

Figure 36:
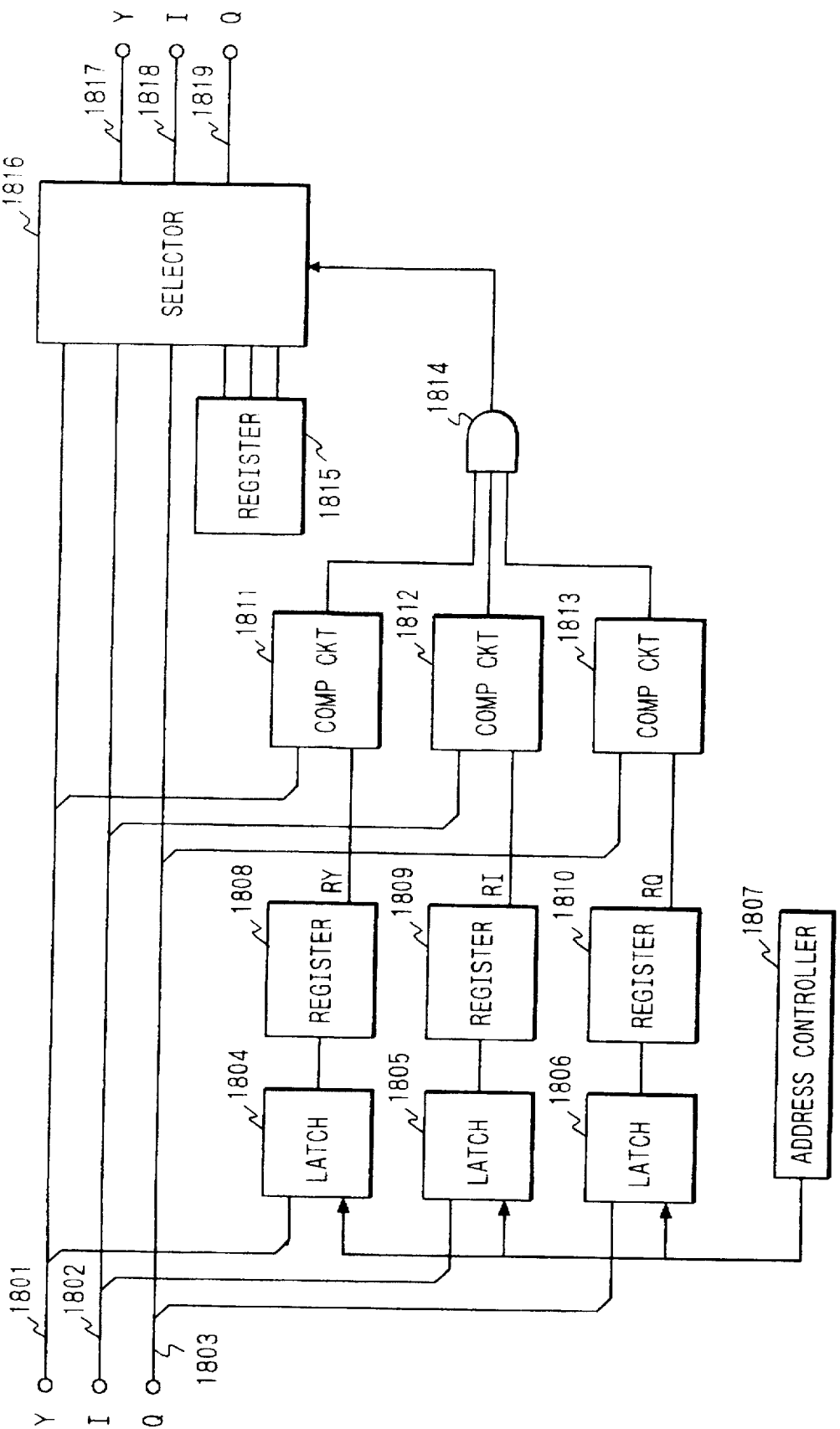
FIG. 36 is a block diagram showing a registration color judgement unit.

Registered color processing will be described in detail. FIG. 36 is a block diagram showing an arrangement of the registered color judgement unit 112. Input data are Y(1801), I(1802), and Q(1803). A color which should not be judged as a color pixel is performed as follows. A portion 1791 as a target color on the registration sheet 1702 in FIG. 35 is scanned, an address controller 1807 outputs a signal to latches 1804 and 1805 so as to store one pixel of the portion 1791 (several pixel data may be latched and averaged, and the average value may be registered as data). The latches 1804, 1805 and a latch 1806 latch data in accordance with a latch signal from the address controller 1807. The Y, I, and Q data of the color to be registered can be registered. The registered data are then registered in registers 1808, 1809, and 1810 from a command from a CPU 111. Therefore, data RY, RI, and RQ are registered in the registers 1808, 1809, and 1810, respectively.

Processing executed upon an input of a color close to that represented by the registered color data will be described below. The registered data RY is compared with input data Y by a comparator 1811. If the following condition is satisfied:

$$Y > RY - 5 \text{ and } Y < RY + 5$$

the comparator 1811 outputs "1" data. Otherwise, the comparator 1811 outputs "0" data. In other words, the Y value is judged whether to fall within the range of ±5 of the value RY of the lightness (luminance) of the registered color data. Similarly, a comparator 1812 judges whether an input I value falls within the range of ±5 of the chromaticity value RI of the registered color data, and a comparator 1813 judges whether an input Q value falls within the range of ±5 of the chromaticity value RQ of the registered color data. An AND gate 1814 outputs "1" data when all the outputs from the comparators 1811, 1812, and 1813 are "1" data. That is, when input data is relatively close to registered data, the AND gate 1814 outputs "1" data. A selector 1816 selects a signal in accordance with an output result of the AND gate 1814. When the output result represents "1" data, the AND gate 1814 selects the content of the register 1815. Otherwise, the AND gate 1814 outputs the input data YIQ without any modifications. When the contents of the register 1815 are Y=0, I=0, and Q=0, and the input data represents a value close to the registered color data, Y, I, and Q data of the black pixel are output. The output results of the registered color judgement unit are Y(1817), I(1818), and Q(1819).

According to this embodiment, since there are provided: a means for separating component signals of the input color signal into lightness and chromaticity signals; a means for generating a saturation signal from the chromaticity signal; a means for comparing the saturation signal with a threshold value α; a means for comparing the saturation signal with a threshold value β; a means for comparing the lightness signal with a threshold value γ; a means for registering a specific color; a means for incrementing a monochrome pixel count by one if the saturation signal is smaller than α as a result of comparison between a pixel of interest and the threshold value; a means for incrementing the monochrome pixel count by one when a pixel satisfying given conditions is included in neighboring pixels, and for incrementing a color pixel count by one when such a pixel is not included in the neighboring pixels, the given conditions being such that the saturation signal is smaller than β as a result of comparison between the saturation signal and β and that the lightness signal is smaller than γ as a result of comparison between the lightness signal and γ, the neighboring pixels being determined when the saturation signal is equal to or larger than α as a result of comparison between the saturation signal of the pixel of interest and the threshold value; a means for selecting the neighboring pixels in accordance with a read magnification; a means for incrementing the monochrome pixel count when the input pixel represents the specific color; a means for performing pixel judgement of a predetermined unit of pixels and judging that an original area of the unit of pixels is a color original area when the color pixel count is larger than δ as a result of comparison between the color pixel count and the threshold value δ; a means for performing judgement in units of original areas throughout the all the areas of the original; a means for changing the threshold value δ in accordance with an original size and a read enlargement/reduction magnification; a means for changing the threshold value α; and a means for judging that the original is a color original when a color original area is present in the original areas, an original can be accurately judged even if the scanner precision is poor or the original has light color paper. Accurate judgement can also be performed for an original having a colored underline. Accurate original judgement can be performed without causing color misregistration when the original is read in an enlargement/reduction mode. Accurate original judgement can also be performed when the original size is changed or the enlargement/reduction magnification is changed. In addition, the judgement result can be adjusted in accordance with the user's will. When a color not to be judged as a color pixel is registered, an original which is supposed to be judged as a color original can be automatically judged as a monochrome original. More specifically, blue of section paper and red of a red seal are registered, monochrome originals with these colors are not judged as color originals but as monochrome originals.

Processing can be performed in accordance with types of originals. Print quality can be improved, and the communication cost can be reduced.

Colors to be registered may be colors of colored regenerated paper in addition to blue of section paper and red of a red seal.

A plurality of colors can be registered.

The colors to be registered need not be input from a scanner. A plurality of registration color data may be stored in a ROM in advance, and a desired registration color may be selected at an operation unit.

The image input means is not limited to the scanner, but can be replaced with an interface such as a host computer, a still video camera, and a video camera.

The number of neighboring pixels is not limited to 8, and OR processing may be replaced with majority decision processing.

The input image may be separated into (L*, a*, b*), (L*, u*, v*), or (Y, u, v) in place of (Y, I, Q).

(Original Having Pixel of Intermediate Saturation as Low Saturation)

Figure 42:
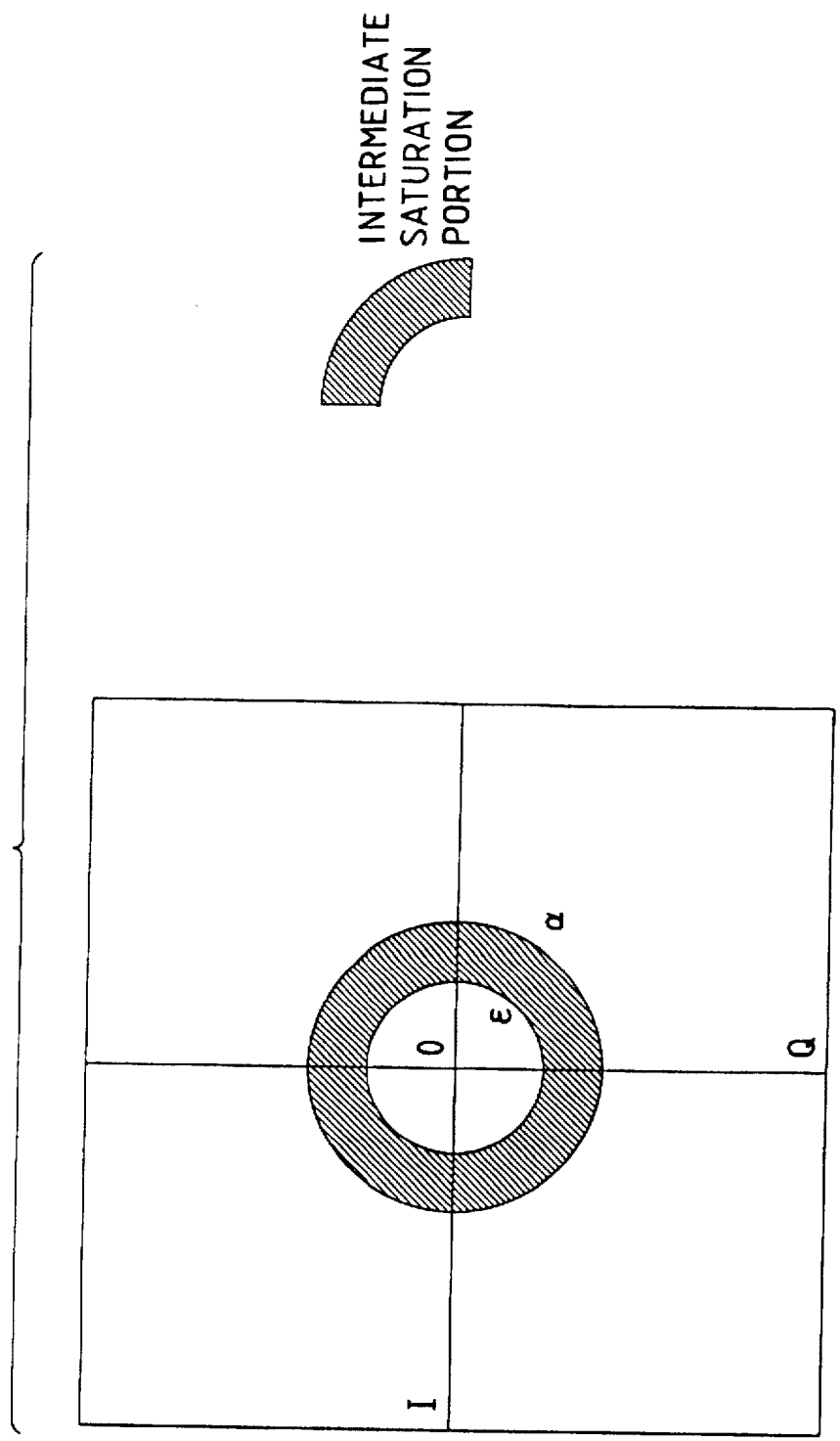
FIG. 42 is a view showing a distribution of an intermediate saturation original.

A pixel included in a hatched portion in FIG. 42 is judged as a monochrome pixel because it has a saturation value smaller than the threshold value α. When a black character original with an under color portion having a low saturation level (e.g., regenerated paper) is taken into consideration, and when the saturation value of the under color portion is smaller than the threshold value α, this original is judged as a monochrome original. Otherwise, the original is judged as a color original. The number of pixels belonging to the hatched portion is relatively increased in a photographic original having a low saturation. In this case, since the saturation value is smaller than the threshold value α, the original is judged as a monochrome original. In an original having an under color portion of a low saturation level, since the number of pixels included in the hatched portion is very larger than that in the photographic original, control is performed to judge the original as a monochrome original when the number of pixels having intermediate saturation values is larger than the predetermined value β. Otherwise, the original is judged as a color original.

(Sixteenth Embodiment)

Figure 41B:
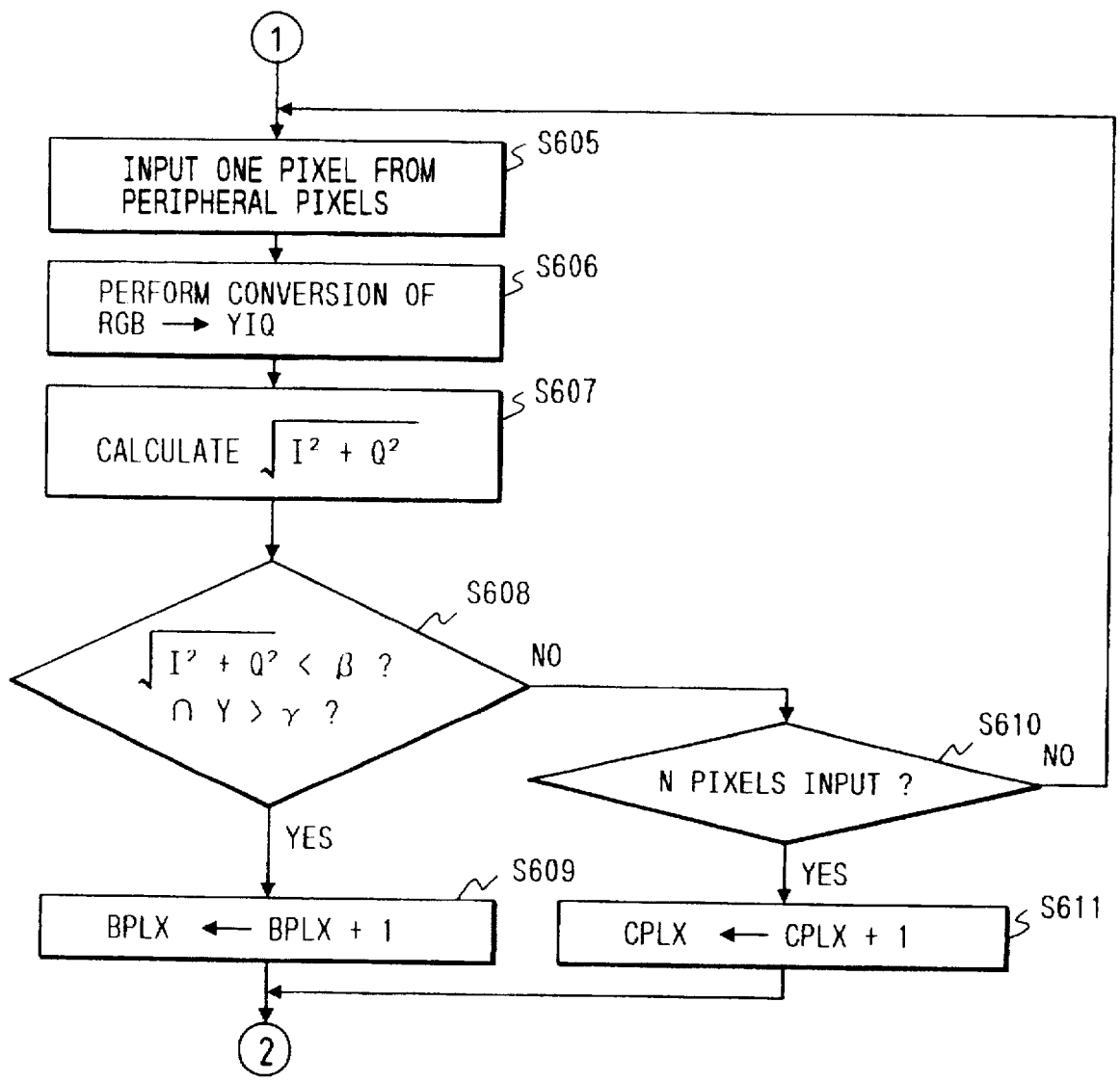
FIG. 41 is a flow chart showing an overall operation in color/monochrome original judgement.

A flow chart of this processing is shown in FIG. 41. The processing is divided into pixel judgement processing (S601 to S604), pixel correction processing (S605 to S611), and original judgement processing (S612 to S615). The pixel judgement processing is processing for judging whether a pixel of interest is a color or monochrome pixel. The original judgement processing is processing for judging whether the original as a whole is a color or monochrome original. The details of the algorithm will be described with reference to the flow chart below.

<Pixel Judgement Processing>

Color pixel judgement processing will be described first. Color pixel judgement is performed in steps S601 to S604 to judge whether an input pixel is a color or monochrome pixel in units of pixels.

① Color Space Conversion Processing

Color Space conversion processing is performed in step S601. More specifically, the data normalized into NTSC-RGB are converted into a luminance signal Y and chrominance signals I and Q in accordance with equations (1) below:

$$\begin{cases} Y = 0.30R + 0.59G + 0.11B \\ I = 0.60R - 0.28G - 0.32B \\ Q = 0.21R - 0.52G + 0.31B \end{cases} \quad (1)$$

② Distance Calculation

In order to generate saturation information from the I and Q data, a distance calculation unit calculates $\sqrt{I^2+Q^2}$ in steps S602 and S606. This distance is a distance between the origin and the target color on the IQ chromaticity diagram. When this value is large, the saturation value is large accordingly. The corresponding pixel has a higher probability as a color pixel.

③ Saturation Comparison Unit

The saturation value of the pixel of interest is compared with the threshold value in step S603. As shown in FIG. 28A, the pixel C of interest is part of a character or an under color portion (limited to white), it has a low saturation level. The flow advances to step S604 to satisfy condition $\sqrt{I^2+Q^2}<\alpha$, and a black pixel count BPLX is incremented by one. The flow returns to step S602, and the next pixel is read to repeat the above processing.

When the pixel of interest is assumed to be located as a color pixel as shown in FIG. 28B, it has a high saturation level, and the flow advances to step S605 without satisfying condition $\sqrt{I^2+Q^2}<\alpha$.

④ Pixel Correction Processing

Steps S605 to S611 correspond to the pixel correction processing unit. These steps are provided to correct a judgement error as a color pixel due to blurring of a black character caused by color misregistration of the sensor even if the saturation comparison unit corresponding to step S603 judges that the input pixel is a color pixel. The pixel correction unit will be described below.

In step S605, eight neighboring pixels $S_1$ to $S_8$ of the pixel C of interest in FIG. 23 are input one by one. In step S606, RGB→YIQ conversion is performed by color space conversion (the same as in steps S601).

Saturation information $\sqrt{I^2+Q^2}$ is calculated in step S607 (the same as in steps S602). Saturation values $\sqrt{I^2+Q^2}$ of the neighboring pixels and the luminance Y are compared with the threshold values in step S608. For example, when the neighboring pixel $S_1$ is a character portion, the saturation and luminance values of this pixel are low, it satisfies conditions $\sqrt{I^2+Q^2}<\beta$ and $Y<\gamma$. As a result, although the pixel C is judged as a color pixel in pixel judgement processing, this misjudgement is caused by color misregistration of the sensor. This pixel must be judged as a black pixel, and the flow advances to step S609. The black pixel count BPLX is incremented by one. Since the neighboring pixel $S_6$ does not satisfy conditions $\sqrt{I^2+Q^2}<\beta$ and $Y<\gamma$, the pixel $S_6$ is determined not to be a black pixel. In this case, the flow advances to step S610. It is judged in step S610 whether all the eight neighboring pixels are input. Processing in steps S605 to S610 to judge whether a black pixel is included in the eight neighboring pixels is repeated for all the eight pixels in S601 to S609 of the pixel of interest. If at least one black pixel is included in the eight neighboring pixels, the pixel C of interest is judged as a black pixel, and the flow advances to step S609. If no black pixel is included in the eight neighboring pixels, the pixel C of interest is not judged as a color pixel by color misregistration, but is a real color pixel. In this case, the flow advances to step S611, and the color pixel count CPLX is incremented by one.

<Color/Monochrome Original Judgement>

The pixel judgement (S601 to S611) described above is performed for all the pixels of the original to calculate a ratio of the color pixel count CPLX to the monochrome pixel count BPLX. When condition CPLX>δ is satisfied in step S613, the target original is judged as a color original. Otherwise, the target original is judged as a monochrome original.

The above flow chart shows processing executed by computer software. A circuit arrangement for performing the above processing will be described with reference to FIG. 38.

When an original is placed on a scanner 101 consisting of a CCD device and scanned, normalized R, G, and B data complying with the NTSC system are output. R, G, and B data output from the scanner 101 are converted by a YIQ conversion unit 101 into a lightness (luminance) signal Y and chrominance (chromaticity) signals I and Q. A pixel judgement unit 103 judges whether an input pixel is a monochrome (small saturation value) or color pixel. An original judgement unit 104 accumulates the judgement results in units of pixels and calculates a ratio of the number of color pixels to the total number of pixels. The original judgement unit 104 outputs an original judgement signal 105 representing that the original is a color or monochrome original in accordance with the calculated ratio. This circuit arrangement also includes an image processing unit 106, a display 107 for performing an image display, a facsimile transmission unit 108 for performing image transmission, a printer 109 for reproducing an image on a recording medium, an intermediate saturation pixel count unit 110, and a CPU 111. The image processing unit 106 perform different processing operations for the monochrome and color originals in accordance with the original judgement signal 105.

For example, an image signal sent to the facsimile transmission unit 108 is subjected to compression coding so as to store it in the form of R, G, and B signals for a color original, and is subjected to density (luminance) signal conversion to perform compression coding such as MH, MR, or MMR coding for a monochrome original.

When an image signal of a color original is to be sent to the printer 109, predetermined processing operations such as logarithmic conversion, UCR, and masking are performed for the R, G, and B signals, thereby performing image processing so as to obtain frame sequential Y, M, C, and K signals. However, an image signal of a monochrome original is processed to obtain only a K (black) signal, thereby performing printing in only black.

The printer may be a color printer such as a laser beam printer, an ink-jet printer, a thermal printer, or a dot printer.

Figure 39:
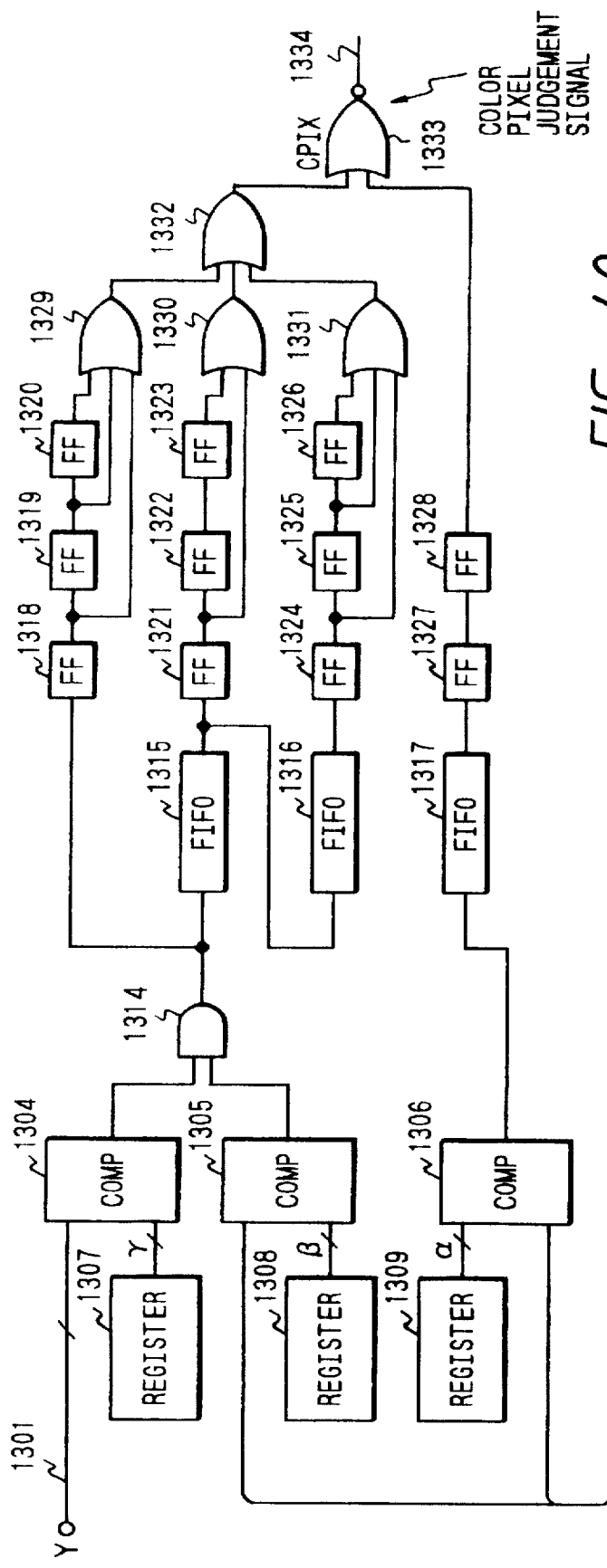
FIG. 39 is a block diagram showing an arrangement of a pixel judgement unit.

FIG. 39 is a view showing the pixel judgement unit. Y, I, and Q data are input to input terminals 1301, 1302, and 1303, respectively. The data I is squared by a multiplier 1310, and the data Q is also squared by a multiplier 1311. The products $I^2$ and $Q^2$ from the multipliers 1310 and 1311 are added by an adder 1312. A calculation of $\sqrt{I^2+Q^2}$ is performed with reference to a table. For example, an input to a ROM 1313 is "2", the second address of the ROM is accessed, and the corresponding data "1.414" is output. The output value $\sqrt{I^2+Q^2}$ from the ROM 1313 is input to comparators 1305 and 1306. A threshold value $\beta$ is set in a register 1308, and the threshold value $\alpha$ is set in a register 1309. The comparator 1305 compares the threshold value $\beta$ with $\sqrt{I^2+Q^2}$ and outputs "1" data if condition $\beta<\sqrt{I^2+Q^2}$. Otherwise, the comparator 1305 outputs "0" data. The comparator 1306 compares the threshold value $\alpha$ with $\sqrt{I^2+Q^2}$ and outputs "1" data if condition $\alpha<\sqrt{I^2+Q^2}$. Otherwise, the comparator 1306 outputs "0" data. An output result of the comparators 1306 is called a primary judgement result.

As for the lightness (luminance) signal, a threshold value $\gamma$ is set in a register 1307, and a comparator 1304 compares Y with $\gamma$. If Y<$\gamma$, then the comparator 1304 outputs "1" data. Otherwise, the comparator 1304 outputs "0" data. Outputs from the comparators 1304 and 1305 are logically ANDed by an AND gate 1314. More specifically, when a lightness (luminance) is low, and saturation is also low, the AND gate 1314 outputs "1" data. Otherwise, the AND gate 1314 outputs "0" data. An output result of the AND gate 1314 is called a secondary judgement result. The output from the AND gate 1314 is input to a flip-flop (to be referred to as an FF hereinafter) 1318 and a line memory 1315. An output from the line memory 1314 is input to line memories 1316 and 1312. A pixel delayed by one line is input to an FF 1321 and a pixel delayed by two lines is input to an FF 1324. The FFs 1318 to 1326 store output results from the AND gate 1314 in synchronism with pixel clocks. At a given moment, when the secondary judgement result of the pixel of interest is stored in the FF 1322, the secondary judgement results of the eight neighboring pixels are stored in the FFs 1318, 1319, 1320, 1321, 1323, 1324, 1325, and 1326, respectively. The secondary judgement results of these eight pixels are logically ORed by OR gates 1329, 1330, 1331, and 1332. Even if one of the eight neighboring pixels has the secondary judgement result of "1", an output from an OR gate 1332 is set at "1". In other words, even if one of the eight neighboring pixels of the pixel of interest is judged as a black pixel, the OR gate 1332 outputs "1" data. An output from this OR gate 1322 is called a pixel correction result. The output (primary judgement result) from the comparator 1306 is input to a line memory 1317 and is delayed by one line. The delayed data is supplied to FFs 1327 and 1328. That is, the FFs 1327 and 1328 store the primary and secondary judgement results of the same pixel.

Finally, the pixel correction result and the primary judgement result are logically NORed by a NOR gate. When the input pixel is judged as a color pixel, a color pixel judgement signal 1334 is set at logic "1". However, when the input pixel is judged as a monochrome pixel, the signal 1334 is set at logic "0".

Figure 40:
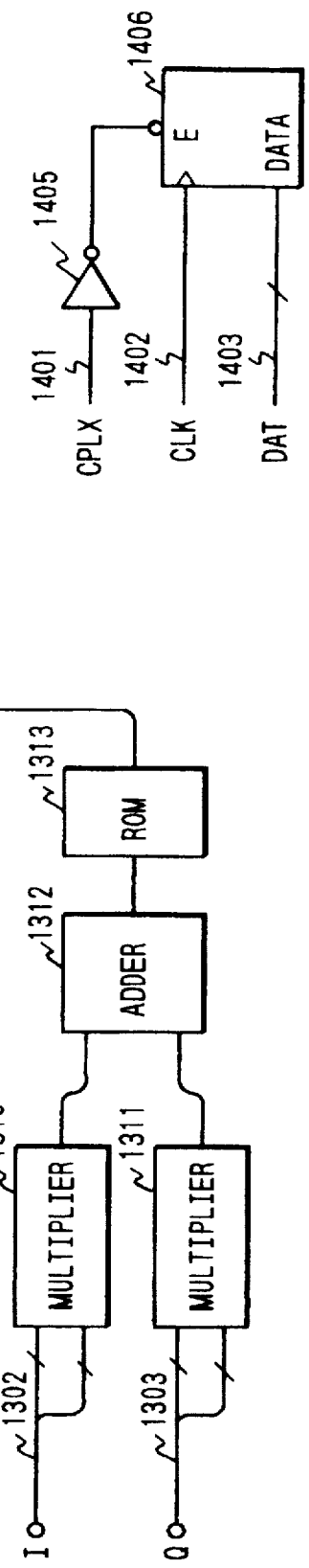
FIG. 40 is a block diagram showing an arrangement of an original judgement unit.

FIG. 40 is a block diagram of the original judgement unit. An up-counter 1406 counts up data from initial count data DAT input to its input 1403 in response to a pixel clock input to its input 1402 and a color pixel judgement signal input to its input 1401. The count-up enable period is defined as a period of the color pixel judgement signal of logic "1". As a result, the color pixel judgement pulses are counted.

Figure 38:
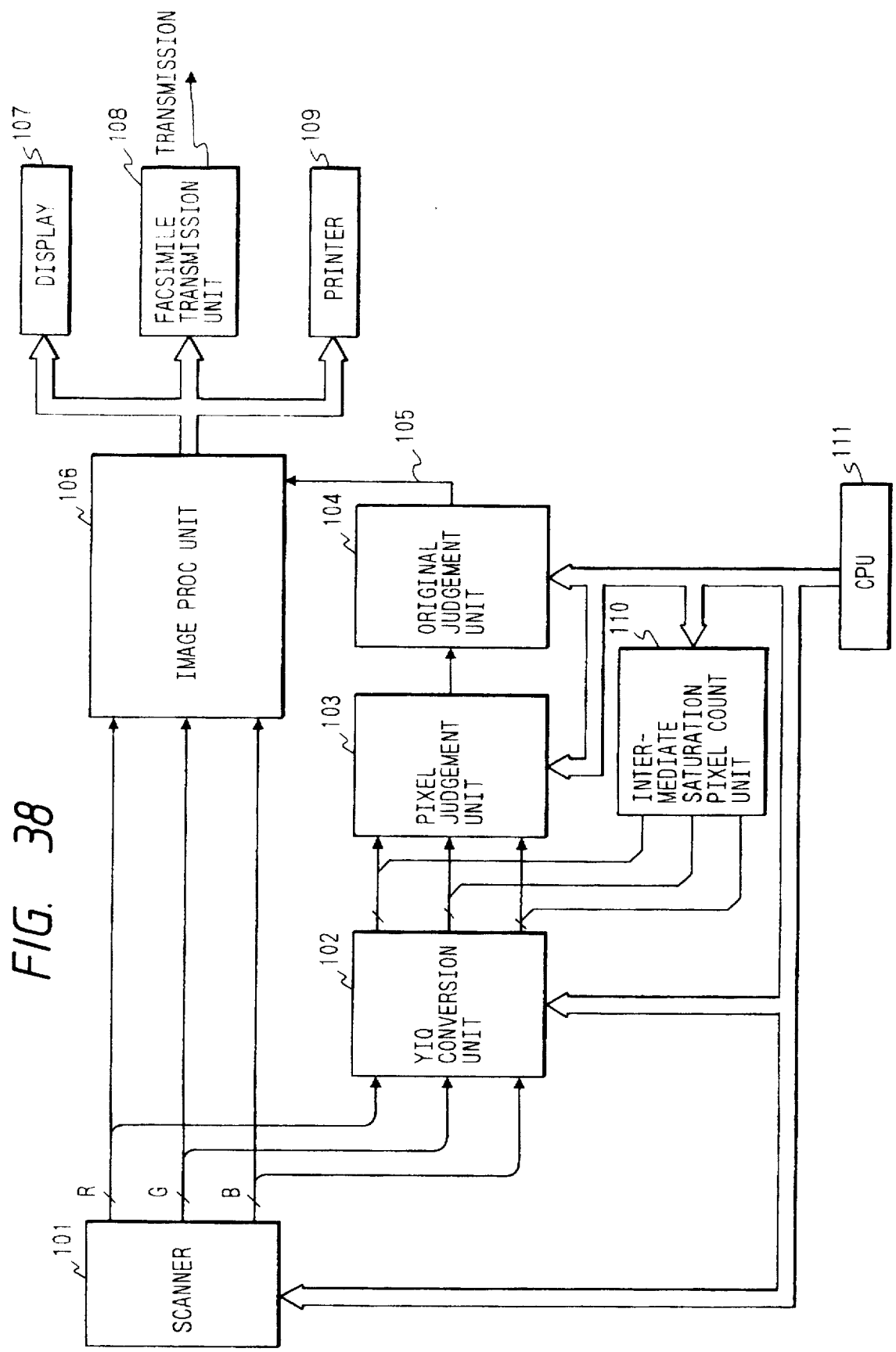
FIG. 38 is a block diagram showing an automatic color/monochrome original judgement apparatus according to the sixteenth embodiment of the present invention.

An intermediate saturation pixel count unit 110 in FIG. 38 counts the number of input pixels having intermediate saturation values. More specifically, referring to FIG. 42, when a pixel satisfying conditions as saturation $\sqrt{I^2+Q^2}>\epsilon$ and saturation $\sqrt{I^2+Q^2}<\alpha$ is input, the count unit 110 counts the number of input pixels having intermediate saturation values. An original judgement unit 104 compares a color pixel count with the threshold value $\delta$. A CPU 111 judges the input original as a color original if condition (color pixel count)>$\delta$ is satisfied. However, if condition (color pixel count)$\leq\delta$ is satisfied, the CPU 111 judges the input original as a monochrome original. The CPU 111 changes the threshold value $\delta$ in accordance with the count of the intermediate saturation pixel count unit. That is, the intermediate saturation pixel count is larger than the predetermined value $\beta$, the threshold value $\delta$ is increased to cause the circuit arrangement to tend to judge the input original as a monochrome original. However, if the intermediate saturation pixel count is small, the threshold value $\delta$ is decreased to cause the apparatus to tend to judge the input original as a color original. The set threshold value is set in a DAT 1403. By changing the judgement criterion for monochrome/color judgement of the original is changed in accordance with the number of pixels having intermediate saturation values between chromatic and achromatic values, thereby obtaining a desired judgement result.

The original can be judged as a color or monochrome original by the above processing.

(Seventeenth Embodiment)

FIG. 23 is a view for explaining the seventeenth embodiment. In the sixteenth embodiment, the arrangement shown in FIG. 20 is used to realize the calculations represented by equations (1). In the seventeenth embodiment, however, the calculations of equations (1) are approximated by the arrangement shown in FIG. 23. When coefficients of equations (1) are approximated by adding 1/(power of 2) to each coefficient to obtain equations (2). For example, the coefficient of 0.3 in equation (1) is approximated as 0.25+0.0625. With this approximation, data obtained by shifting the input data by two bits is added to data obtained by shifting the input by four bits to facilitate a calculation of 0.3*R.

According to this embodiment, since there are provided: a means for separating component signals of the input color signal into lightness and chromaticity signals; a means for generating a saturation signal from the chromaticity signal; a means for comparing the saturation signal with a threshold value α; a means for comparing the saturation signal with a threshold value β; a means for comparing the lightness signal with a threshold value γ; a means for counting input signals having intermediate saturation values; a means for incrementing a monochrome pixel count by one if the saturation signal is smaller than α as a result of comparison between a pixel of interest and the threshold value; a means for incrementing the monochrome pixel count by one when a pixel satisfying given conditions is included in neighboring pixels, and for incrementing a color pixel count by one when such a pixel is not included in the neighboring pixels, the given conditions being such that the saturation signal is smaller than β as a result of comparison between the saturation signal and β and that the lightness signal is smaller than γ as a result of comparison between the lightness signal and γ, the neighboring pixels being determined when the saturation signal is equal to or larger than α as a result of comparison between the saturation signal of the pixel of interest and the threshold value; a means for changing the threshold value δ in accordance with a total number of input signals having the intermediate saturation values, a means for comparing the color pixel count with the threshold value δ; and a means for judging an input original as a color original when the color pixel count is larger than the threshold value δ as a result of comparison between the color pixel count and the threshold value δ, an original can be accurately judged even if the scanner precision is poor or the original has light color paper. Even if a photographic original having a low saturation level can be accurately judged without any judgement errors. Therefore, processing can be performed in accordance with types of originals. Print quality can be improved, and the communication cost can be reduced.

The image input means is not limited to the scanner, but can be replaced with an interface such as a host computer, a still video camera, and a video camera.

The number of neighboring pixels is not limited to 8, and OR processing may be replaced with majority decision processing.

The input image may be separated into (L*, a*, b*), (L*, u*, v*), (Y, u, v) or (Y, Cr, Cb) in place of (Y, I, Q).

The present invention is not limited to the particular embodiments described above. Various changes and modifications may be made within the scope of the appended claims.

What is claimed is:

1. An image processing apparatus comprising:
   a) first judging means for performing a color/monochrome judgment in accordance with an input color signal representing a pixel;
   b) second judging means for performing a color/monochrome judgment of one-frame input color signals representing an original composed of a plurality of pixels;
   c) control means for excluding a predetermined color from judgment objects of said second judging means.

2. An apparatus according to claim 1, further comprising means for correcting a judgment result of said first judging means with reference to neighboring pixels.

3. An apparatus according to claim 1, further comprising means for processing the input color signal in accordance with the judgment result of said second judging means.

4. An apparatus according to claim 1, further comprising designating means for designating the predetermined color.

5. An image processing apparatus comprising:
   a) judging means for performing a color/monochrome judgment of an input color signal;
   b) processing means for changing a magnification of an image represented by the input color signal; and
   c) control means for changing a judgment parameter of said judging means in accordance with the magnification.

6. An apparatus according to claim 5, further comprising means for correcting a judgment result of said judging means with reference to neighboring pixels.

7. An apparatus according to claim 5, further comprising means for performing monochrome/color judgment of an original represented by the input color signal, in accordance with the judgment result.

8. An apparatus according to claim 7, further comprising means for processing the input color signal in accordance with the judgment result.

9. An image processing apparatus comprising:
   a) judging means for performing a color/monochrome judgment of an input color signal; and
   b) control means for controlling a judgment reference of said judging means in accordance with a number of intermediate saturation pixels included in the input color signal.

10. An apparatus according to claim 9, further comprising means for correcting a judgment result of said judging means with reference to neighboring pixels.

11. An apparatus according to claim 9, further comprising means for performing monochrome/color judgment of an original represented by the input color signal, in accordance with the judgment result.

12. An apparatus according to claim 11, further comprising means for processing the input color signal in accordance with the judgment result.

13. An image processing method comprising:
   a) a first judging step of performing a color/monochrome judgment in accordance with an input color signal representing a pixel;
   b) a second judging step of performing a color/monochrome judgment of one-frame input color signals representing an original composed of a plurality of pixels;
   c) a control step of excluding a predetermined color from judgment objects of said second judging step.

14. A method according to claim 13, further comprising a correcting step of correcting a judgment result of said first judging step with reference to neighboring pixels.

15. A method according to claim 13, further comprising a processing step of processing the input color signal in accordance with the judgment result of said second judging step.

16. A method according to claim 13, further comprising a designating step of designating the predetermined color.

17. An image processing method comprising:
   a) a judging step of performing a color/monochrome judgment of an input color signal;
   b) a processing step of changing a magnification of an image represented by the input color signal; and
   c) a control step of changing a judgment parameter of said judging step in accordance with the magnification.

18. A method according to claim 17, further comprising a correcting step of correcting a judgment result of said judging step with reference to neighboring pixels.

19. A method according to claim 17, further comprising a performing step of performing a monochrome/color judgment of an original represented by the input color signal, in accordance with the judgment result.

20. A method according to claim 19, further comprising a processing step of processing the input color signal in accordance with the judgment result.

21. An image processing method comprising:

a) a judging step of performing chromatic/achromatic judgment of an input color signal; and b) a control step of controlling a judgment reference of said judging step in accordance with a number of intermediate saturation pixels included in the input color signal.

22. A method according to claim 21, further comprising a correcting step of correcting a judgment result of said judging step with reference to neighboring pixels.

23. A method according to claim 21, further comprising a performing step of performing a monochrome/color judgment of an original represented by the input color signal, in accordance with the judgment result.

24. A method according to claim 23, further comprising a processing step of processing the input color signal in accordance with the judgment result.

* * * * *

UNITED STATES PATENT AND TRADEMARK OFFICE
CERTIFICATE OF CORRECTION

PATENT NO. : 5,786,906

DATED : July 28, 1998

INVENTOR(S) : JUNICHI SHISHIZUKA

Figure 27B:
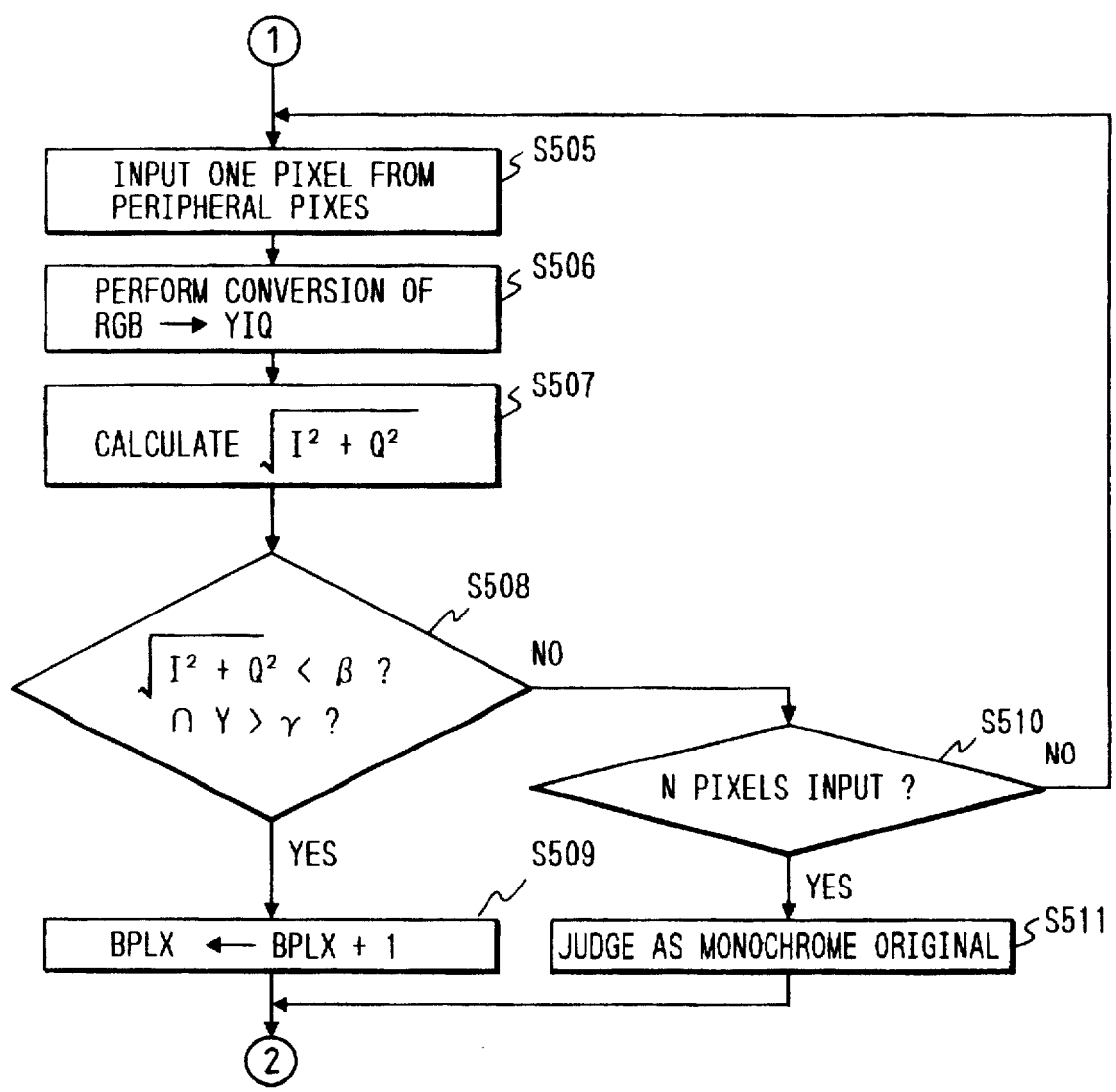
FIG. 27 is a flow chart showing an overall operation in color/monochrome original judgement.

It is certified that error appears in the above-identified patent and that said Letters Patent is hereby corrected as shown below:

<u>IN THE DRAWINGS</u>:

Sheet 25 of 37:   Fig. 27B "PIXES" should read --PIXELS--.

<u>COLUMN 1</u> line 33,   "application" should read --applications--.

<u>COLUMN 6</u> line 8,   "to judging" should read --to judge--.

<u>COLUMN 9</u> line 33,   "Although achromatic" should read --Achromatic--; and line 40,   "extremely" should read --significantly--.

<u>COLUMN 10</u> line 48,   "15" should read --315--.

UNITED STATES PATENT AND TRADEMARK OFFICE
CERTIFICATE OF CORRECTION

PATENT NO.    : 5,786,906

DATED         : July 28, 1998

INVENTOR(S)   : JUNICHI SHISHIZUKA

It is certified that error appears in the above-identified patent and that said Letters Patent is hereby corrected as shown below:

<u>COLUMN 12</u> line 51,    "of the part" should be deleted.

<u>COLUMN 13</u> line 33,    "value a" should read --value $\alpha$--.

<u>COLUMN 15</u> line 25,    "as" should read --is--.

<u>COLUMN 19</u> line 59,    "which" should be deleted.

<u>COLUMN 24</u> line 29,    "an" should read --a--; and line 32,    "the" (first occurrence) should be deleted.

<u>COLUMN 26</u> line 29,    "the" (first occurrence) should be deleted.

UNITED STATES PATENT AND TRADEMARK OFFICE
CERTIFICATE OF CORRECTION

PATENT NO. : 5,786,906

DATED : July 28, 1998

INVENTOR(S) : JUNICHI SHISHIZUKA

It is certified that error appears in the above-identified patent and that said Letters Patent is hereby corrected as shown below:

<u>COLUMN 27</u> line 18,   "very" should be deleted.

<u>COLUMN 29</u> line 6,   "perform" should read --performs--.

<u>COLUMN 31</u> line 30,   "if" should be deleted.

Signed and Sealed this

Twenty-eighth Day of September, 1999

*Attest:*

Q. TODD DICKINSON

*Attesting Officer*    *Acting Commissioner of Patents and Trademarks*